US011943600B2

(12) United States Patent
Germain et al.

(10) Patent No.: US 11,943,600 B2
(45) Date of Patent: Mar. 26, 2024

(54) RENDERING AUDIO OBJECTS WITH MULTIPLE TYPES OF RENDERERS

(71) Applicant: Dolby Laboratories Licensing Corporation, San Francisco, CA (US)

(72) Inventors: François G. Germain, Boston, MA (US); Alan J. Seefeldt, Alameda, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 247 days.

(21) Appl. No.: 17/607,956

(22) PCT Filed: May 1, 2020

(86) PCT No.: PCT/US2020/031154

§ 371 (c)(1),
(2) Date: Nov. 1, 2021

(87) PCT Pub. No.: WO2020/227140

PCT Pub. Date: Nov. 12, 2020

(65) Prior Publication Data

US 2022/0286800 A1 Sep. 8, 2022

Related U.S. Application Data

(60) Provisional application No. 62/842,827, filed on May 3, 2019.

(30) Foreign Application Priority Data

May 3, 2019 (EP) .................................... 19172615

(51) Int. Cl.
*H04S 7/00* (2006.01)
*H04R 5/02* (2006.01)
*H04S 3/00* (2006.01)

(52) U.S. Cl.
CPC ............... *H04S 7/302* (2013.01); *H04R 5/02* (2013.01); *H04S 3/008* (2013.01);
(Continued)

(58) Field of Classification Search
CPC . H04S 7/302; H04S 5/02; H04S 3/008; H04S 2400/01; H04S 2400/11; H04S 2400/13; H04R 1/403; H04R 2201/403
See application file for complete search history.

(56) References Cited

U.S. PATENT DOCUMENTS 7,515,719 B2 4/2009 Hooley
8,391,521 B2 3/2013 Takumai
(Continued)

FOREIGN PATENT DOCUMENTS

EP 2335428 B1 1/2015
JP 2017523694 A 8/2017
(Continued)

OTHER PUBLICATIONS

Ahrens, J. et al. "Reproduction of a plane-wave sound field using planar and linear arrays of loudspeakers.," 3rd International Symposium on Communications, Control and Signal Processing (ISCCSP), 2008.

(Continued)

*Primary Examiner* — Jason R Kurr

(57) ABSTRACT

An apparatus and method of rendering audio objects with multiple types of renderers. The weighting between the selected renderers depends upon the position information in each audio object. As each type of renderer has a different output coverage, the combination of their weighted outputs results in the audio being perceived at the position according to the position information.

20 Claims, 13 Drawing Sheets

(52) U.S. Cl.
CPC ....... *H04S 2400/01* (2013.01); *H04S 2400/11* (2013.01); *H04S 2400/13* (2013.01)

(56) References Cited

U.S. PATENT DOCUMENTS

| | | | | |
|---|---|---|---|---|
| 2012/0070021 | A1* | 3/2012 | Yoo | H04S 3/002 381/306 |
| 2015/0245157 | A1 | 8/2015 | Seefeldt | |
| 2015/0350804 | A1 | 12/2015 | Crockett | |
| 2016/0080886 | A1* | 3/2016 | De Bruijn | H04S 7/308 381/17 |
| 2016/0300577 | A1 | 10/2016 | Fersch | |
| 2017/0013388 | A1 | 1/2017 | Fueg | |
| 2017/0048640 | A1 | 2/2017 | Dressler | |
| 2019/0215632 | A1* | 7/2019 | Chung | H04S 7/30 |
| 2020/0053461 | A1* | 2/2020 | Suenaga | G10L 19/008 |
| 2020/0120438 | A1* | 4/2020 | Kim | H04S 3/008 |
| 2021/0168548 | A1* | 6/2021 | Honma | H04S 7/30 |

FOREIGN PATENT DOCUMENTS

| | | | |
|---|---|---|---|
| WO | 2014184353 | A1 | 11/2014 |
| WO | 2017030914 | A1 | 2/2017 |
| WO | 2017087564 | A1 | 5/2017 |
| WO | 2018150774 | A1 | 8/2018 |
| WO | 2019049409 | A1 | 3/2019 |

OTHER PUBLICATIONS

Bianchi, L. et al, "Robust beamforming under uncertainties in the loudspeakers directivity pattern," Proceedings of 2014 IEEE International Conference on Acoustics, Speech and Signal Processing (ICASSP), pp. 4448-4452, May 2014.

C. Q. Robinson, et al. "Scalable Format and Tools to Extend the Possibilities of Cinema Audio," SMPTE Motion Imaging Journal, vol. 121, No. 8, pp. 63-69, Nov. 2012.

F. Rumsey, Spatial Audio. Focal Press, 2001.

H. Wierstorf, "Perceptual Assessment of Sound Field Synthesis," Technische Universität Berlin, 2014.

J. Daniel, "Representation de champs acoustiques, application a la transmission et a la restitution de scenes sonores complexes dans un contexte multimedia," Paris 6, 2000.

J. O. Smith, Spectral audio signal processing. W3K, 2011.

Jot, Jean-Marc, "Interactive 3D Audio Rendering in Flexible Playback Configurations" IEEE Dec. 2012.

M. N. Montag, "Wave field synthesis in Three Dimensions by Multiple Line Arrays," University of Miami, 2011.

Pulkki, V. et al "Multichannel Audio Rendering Using Amplitude Panning" IEEE Signal Processing Magazine, May 2008, pp. 1-5.

Ranjan. R. et al. "A hybrid speaker array-headphone system for immersive 3D audio reproduction," Proceedings of the 2015 IEEE International Conference on Acoustics, Speech and Signal Processing (ICASSP), pp. 1836-1840, Apr. 2015.

Spors, S. et al. "Spatial Sound With Loudspeakers and Its Perception: A Review of the Current State," Proceedings of the IEEE, vol. 101, No. 9, pp. 1920-1938, Sep. 2013.

Spors, S. et al. "The theory of wave field synthesis revisited," 124th AES Convention, 2008.

V. Pulkki, "Virtual sound source positioning using vector base amplitude panning," Journal of the Audio Engineering Society, vol. 45, No. 6, pp. 456-466, 1997.

W. Gardner, 3-D audio using loudspeakers. Springer Science & Business Media, 1998.

Wittek, H. et al, "Perceptual Enhancement of Wavefield Synthesis by Stereophonic Means," Journal of the Audio Engineering Society, vol. 55, No. 9, pp. 723-751, 2007.

* cited by examiner

RENDERING AUDIO OBJECTS WITH MULTIPLE TYPES OF RENDERERS

BACKGROUND

The present invention relates to audio processing, and in particular, to processing audio objects using multiple types of renderers.

Unless otherwise indicated herein, the approaches described in this section are not prior art to the claims in this application and are not admitted to be prior art by inclusion in this section.

Audio signals may be generally categorized into two types: channel-based audio and object-based audio.

In channel-based audio, the audio signal includes a number of channel signals, and each channel signal corresponds to a loudspeaker. Example channel-based audio signals include stereo audio, 5.1-channel surround audio, 7.1-channel surround audio, etc. Stereo audio includes two channels, a left channel for a left loudspeaker and a right channel for a right loudspeaker. 5.1-channel surround audio includes six channels: a front left channel, a front right channel, a center channel, a left surround channel, a right surround channel, and a low-frequency effects channel. 7.1-channel surround audio includes eight channels: a front left channel, a front right channel, a center channel, a left surround channel, a right surround channel, a left rear channel, a right rear channel, and a low-frequency effects channel.

In object-based audio, the audio signal includes audio objects, and each audio object includes position information on where the audio of that audio object is to be output. This position information may thus be agnostic with respect to the configuration of the loudspeakers. A rendering system then renders the audio object using the position information to generate the particular signals for the particular configuration of the loudspeakers. Examples of object-based audio include Dolby® Atmos™ audio, DTS:X™ audio, etc.

Both channel-based systems and object-based systems may include renderers that generate the loudspeaker signals from the channel signals or the object signals. Renderers may be categorized into various types, including wave field renderers, beamformers, panners, binaural renderers, etc.

SUMMARY

Although many existing systems combine multiple renderers, they do not recognize that the selection of renderers may be made based on the desired perceived location of the sound. In many listening environments, the listening experience may be improved by accounting for the desired perceived location of the sound when selecting the renderers. Thus, there is a need for a system that accounts for the desired perceived location of the sound when selecting the renderers, and when assigning the weights to be used between the selected renderers.

Given the above problems and lack of solutions, the embodiments described herein are directed toward using the desired perceived position of an audio object to control two or more renderers, optionally having a single category or different categories.

According to an embodiment, a method of audio processing includes receiving one or more audio objects, wherein each of the one or more audio objects respectively includes position information. The method further includes, for a given audio object of the one or more audio objects, selecting, based on the position information of the given audio object, at least two renderers of a plurality of renderers, for example the at least two renderers having at least two categories; determining, based on the position information of the given audio object, at least two weights; rendering, based on the position information, the given audio object using the at least two renderers weighted according to the at least two weights, to generate a plurality of rendered signals; and combining the plurality of rendered signals to generate a plurality of loudspeaker signals. The method further includes outputting, from a plurality of loudspeakers, the plurality of loudspeaker signals.

The at least two categories may include a sound field renderer, a beamformer, a panner, and a binaural renderer.

A given rendered signal of the plurality of rendered signals may include at least one component signal, wherein each of the at least one component signal is associated with a respective one of the plurality of loudspeakers, and wherein a given loudspeaker signal of the plurality of loudspeaker signals corresponds to combining, for a given loudspeaker of the plurality of loudspeakers, all of the at least one component signal that are associated with the given loudspeaker.

A first renderer may generate a first rendered signal, wherein the first rendered signal includes a first component signal associated with a first loudspeaker and a second component signal associated with a second loudspeaker. A second renderer may generate a second rendered signal, wherein the second rendered signal includes a third component signal associated with the first loudspeaker and a fourth component signal associated with the second loudspeaker. A first loudspeaker signal associated with the first loudspeaker may correspond to combining the first component signal and the third component signal. A second loudspeaker signal associated with the second loudspeaker may correspond to combining the second component signal and the fourth component signal.

Rendering the given audio object may include, for a given renderer of the plurality of renderers, applying a gain based on the position information to generate a given rendered signal of the plurality of rendered signals.

The plurality of loudspeakers may include a dense linear array of loudspeakers.

The at least two categories may include a sound field renderer, wherein the sound field renderer performs a wave field synthesis process.

The plurality of loudspeakers may be arranged in a first group that is directed in a first direction and a second group that is directed in a second direction that differs from the first direction. The first direction may include a forward component and the second direction may include a vertical component. The second direction may include a vertical component, wherein the at least two renderers includes a wave field synthesis renderer and an upward firing panning renderer, and wherein the wave field synthesis renderer and the upward firing panning renderer generate the plurality of rendered signals for the second group. The second direction may include a vertical component, wherein the at least two renderers includes a wave field synthesis renderer, an upward firing panning renderer and a beamformer, and wherein the wave field synthesis renderer, the upward firing panning renderer and the beamformer generate the plurality of rendered signals for the second group. The second direction may include a vertical component, wherein the at least two renderers includes a wave field synthesis renderer, an upward firing panning renderer and a side firing panning renderer, and wherein the wave field synthesis renderer, the upward firing panning renderer and the side firing panning renderer generate the plurality of rendered signals for the second group. The first direction may include a forward component and the second direction may include a side component. The first direction may include a forward component, wherein the at least two renderers includes a wave field synthesis renderer, and wherein the wave field synthesis renderer generates the plurality of rendered signals for the first group. The second direction may include a side component, wherein the at least two renderers includes a wave field synthesis renderer and a beamformer, and wherein the wave field synthesis renderer and the beamformer generate the plurality of rendered signals for the second group. The second direction may include a side component, wherein the at least two renderers includes a wave field synthesis renderer and a side firing panning renderer, and wherein the wave field synthesis renderer and the side firing panning renderer generate the plurality of rendered signals for the second group.

The method may further include combining the plurality of rendered signals for the one or more audio objects to generate the plurality of loudspeaker signals.

The at least two renderers may include renderers in series.

The at least two renderers may include an amplitude panner, a plurality of binaural renderers, and a plurality of beamformers. The amplitude panner may be configured to render, based on the position information, the given audio object to generate a first plurality of signals. The plurality of binaural renderers may be configured to render the first plurality of signals to generate a second plurality of signals. The plurality of beamformers may be configured to render the second plurality of signals to generate a third plurality of signals. The third plurality of signals may be combined to generate the plurality of loudspeaker signals.

According to another embodiment, a non-transitory computer readable medium stores a computer program that, when executed by a processor, controls an apparatus to execute processing including one or more of the method steps discussed herein.

According to another embodiment, an apparatus for processing audio includes a plurality of loudspeakers, a processor, and a memory. The processor is configured to control the apparatus to receive one or more audio objects, wherein each of the one or more audio objects respectively includes position information. For a given audio object of the one or more audio objects, the processor is configured to control the apparatus to select, based on the position information of the given audio object, at least two renderers of a plurality of renderers, wherein the at least two renderers have at least two categories; the processor is configured to control the apparatus to determine, based on the position information of the given audio object, at least two weights; the processor is configured to control the apparatus to render, based on the position information, the given audio object using the at least two renderers weighted according to the at least two weights, to generate a plurality of rendered signals; and the processor is configured to control the apparatus to combine the plurality of rendered signals to generate a plurality of loudspeaker signals. The processor is configured to control the apparatus to output, from the plurality of loudspeakers, the plurality of loudspeaker signals.

The apparatus may include further details similar to those of the methods described herein.

According to another embodiment, a method of audio processing includes receiving one or more audio objects, wherein each of the one or more audio objects respectively includes position information. For a given audio object of the one or more audio objects, the method further includes rendering, based on the position information, the given audio object using a first category of renderer to generate a first plurality of signals; rendering the first plurality of signals using a second category of renderer to generate a second plurality of signals; rendering the second plurality of signals using a third category of renderer to generate a third plurality of signals; and combining the third plurality of signals to generate a plurality of loudspeaker signals. The method further includes outputting, from a plurality of loudspeakers, the plurality of loudspeaker signals.

The first category of renderer may correspond to an amplitude panner, the second category of renderer may correspond to a plurality of binaural renderers, and the third category of renderer may correspond to a plurality of beamformers.

The method may include further details similar to those described regarding the other methods discussed herein.

According to another embodiment, an apparatus for processing audio includes a plurality of loudspeakers, a processor, and a memory. The processor is configured to control the apparatus to receive one or more audio objects, wherein each of the one or more audio objects respectively includes position information. For a given audio object of the one or more audio objects, the processor is configured to control the apparatus to render, based on the position information, the given audio object using a first category of renderer to generate a first plurality of signals; the processor is configured to control the apparatus to render the first plurality of signals using a second category of renderer to generate a second plurality of signals; the processor is configured to control the apparatus to render the second plurality of signals using a third category of renderer to generate a third plurality of signals; and the processor is configured to control the apparatus to combine the third plurality of signals to generate a plurality of loudspeaker signals. The processor is configured to control the apparatus to output, from the plurality of loudspeakers, the plurality of loudspeaker signals.

The apparatus may include further details similar to those of the methods described herein.

The following detailed description and accompanying drawings provide a further understanding of the nature and advantages of various implementations.

DETAILED DESCRIPTION

Described herein are techniques for audio rendering. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

Figure 1:
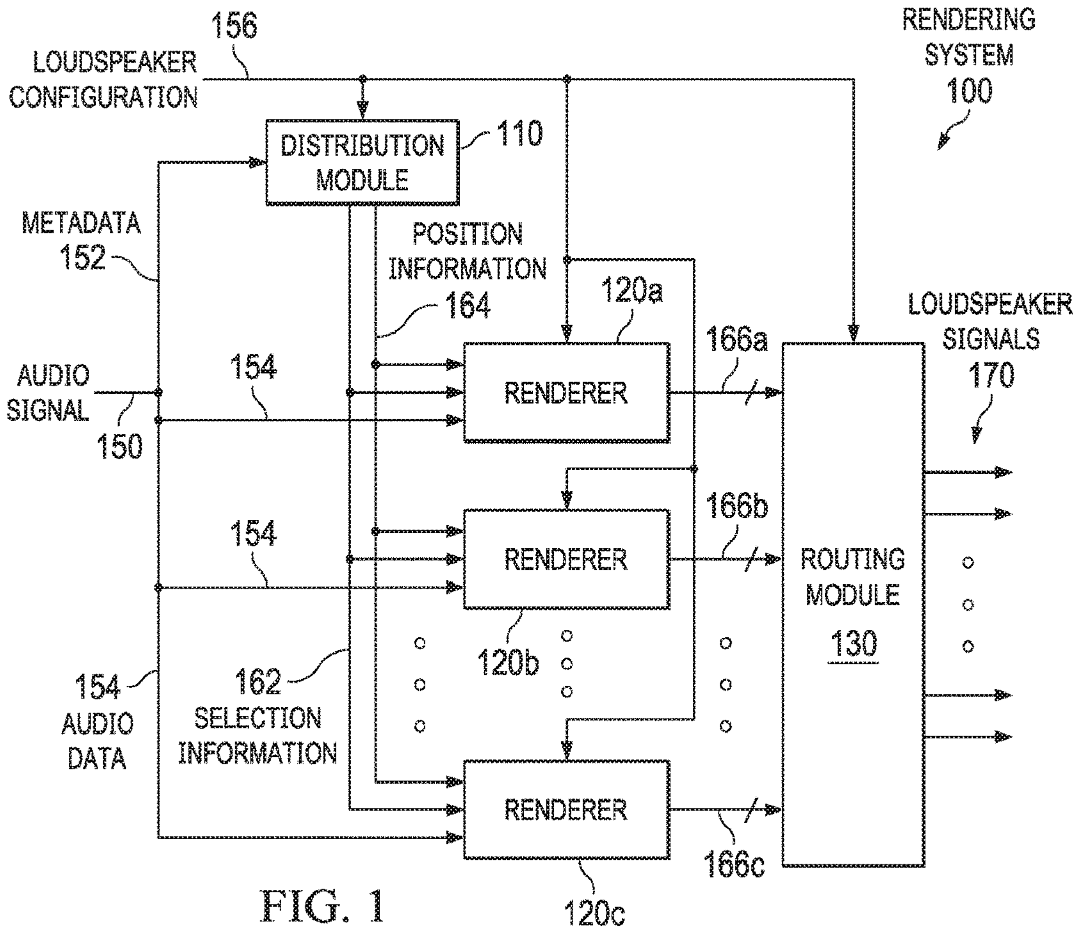
FIG. 1 is a block diagram of a rendering system 100.

FIG. 1 is a block diagram of a rendering system 100. The rendering system 100 includes a distribution module 110, a number of renderers 120 (three shown: 120*a*, 120*b* and 120*c*), and a routing module 130. The renderers 120 are categorized into a number of different categories, which are discussed in more detail below. The rendering system 100 receives an audio signal 150, renders the audio signal 150, and generates a number of loudspeaker signals 170. Each of the loudspeaker signals 170 drives a loudspeaker (not shown).

The audio signal 150 is an object audio signal and includes one or more audio objects. Each of the audio objects includes object metadata 152 and object audio data 154. The object metadata 152 includes position information for the audio object. The position information corresponds to the desired perceived position for the object audio data 154 of the audio object. The object audio data 154 corresponds to the audio data that is to be rendered by the rendering system 100 and output by the loudspeakers (not shown). The audio signal 150 may be in one or more of a variety of formats, including the Dolby® Atmos™ format, the Ambisonics format (e.g., B-format), the DTS:X™ format from Xperi Corp., etc. For brevity, the following refers to a single audio object in order to describe the operation of the rendering system 100, with the understanding that multiple audio objects may be processed concurrently, for example by instantiating multiple instances of one or more of the renderers 120. For example, an implementation of the Dolby® Atmos™ system may reproduce up to 128 simultaneous audio objects in the audio signal 150.

The distribution module 110 receives the object metadata 152 from the audio signal 150. The distribution module 110 also receives loudspeaker configuration information 156. The loudspeaker configuration information 156 generally indicates the configuration of the loudspeakers connected to the rendering system 100, such as their numbers, configurations or physical positions. When the loudspeaker positions are fixed (e.g., being components physically attached to a device that includes the rendering system 100), the loudspeaker configuration information 156 may be static, and when the loudspeaker positions may be adjusted, the loudspeaker configuration information 156 may be dynamic. The dynamic information may be updated as desired, e.g. when the loudspeakers are moved. The loudspeaker configuration information 156 may be stored in a memory (not shown).

Based on the object metadata 152 and the loudspeaker configuration information 156, the distribution module 110 determines selection information 162 and position information 164. The selection information 162 selects two or more of the renderers 120 that are appropriate for rendering the audio object for the given position information in the object metadata 152, given the arrangement of the loudspeakers according to the loudspeaker configuration information 156. The position information 164 corresponds to the source position to be rendered by each of the selected renderers 120. In general, the position information 164 may be considered to be a weighting function that weights the object audio data 154 among the selected renderers 120.

The renderers 120 receive the object audio data 154, the loudspeaker configuration information 156, the selection information 162 and the position information 164. The renderers 120 use the loudspeaker configuration information 156 to configure their outputs. The selection information 162 selects two or more of the renderers 120 to render the object audio data 154. Based on the position information 164, each of the selected renderers 120 renders the object audio data 154 to generate rendered signals 166. (E.g., the renderer 120*a* generates the rendered signals 166*a*, the renderer 120*b* generates the rendered signals 166*b*, etc.). Each of the rendered signals 166 from each of the renderers 120 corresponds to a driver signal for one of the loudspeakers (not shown), as configured according to the loudspeaker configuration information 156. For example, if the rendering system 100 is connected to 14 loudspeakers, the renderer 120*a* generates up to 14 rendered signals 166*a*. (If a given audio object is rendered such that it is not to be output from a particular loudspeaker, then that one of the rendered signals 166 may be considered to be zero or not present, as indicated by the loudspeaker configuration information 156.)

The routing module 130 receives the rendered signals 166 from each of the renderers 120 and the loudspeaker configuration information 156. Based on the loudspeaker configuration information 156, the routing module 130 combines the rendered signals 166 to generate the loudspeaker signals 170. To generate each of the loudspeaker signals 170, the routing module 130 combines, for each loudspeaker, each one of the rendered signals 166 that correspond to that loudspeaker. For example, a given loudspeaker may be related to one of the rendered signals 166*a*, one of the rendered signals 166*b*, and one of the rendered signals 166*c*; the routing module 130 combines these three signals to generate the corresponding one of the loudspeaker signals 170 for that given loudspeaker. In this manner, the routing module 130 performs a mixing function of the appropriate rendered signals 166 to generate the respective loudspeaker signals 170.

Due to the linearity of acoustics, the principle of superposition allows the rendering system 100 to use any given loudspeaker concurrently for any number of the renderers 120. The routing module 130 implements this by summing, for each loudspeaker, the contribution from each of the renderers 120. As long as the sum of those signals does not overload the loudspeaker, the result corresponds to a situation where independent loudspeakers are allocated to each renderer, in terms of impression for the listener.

When multiple audio objects are rendered to be output concurrently, the routing module 130 combines the rendered signals 166 in a manner similar to the single audio object case discussed above.

Figure 2:
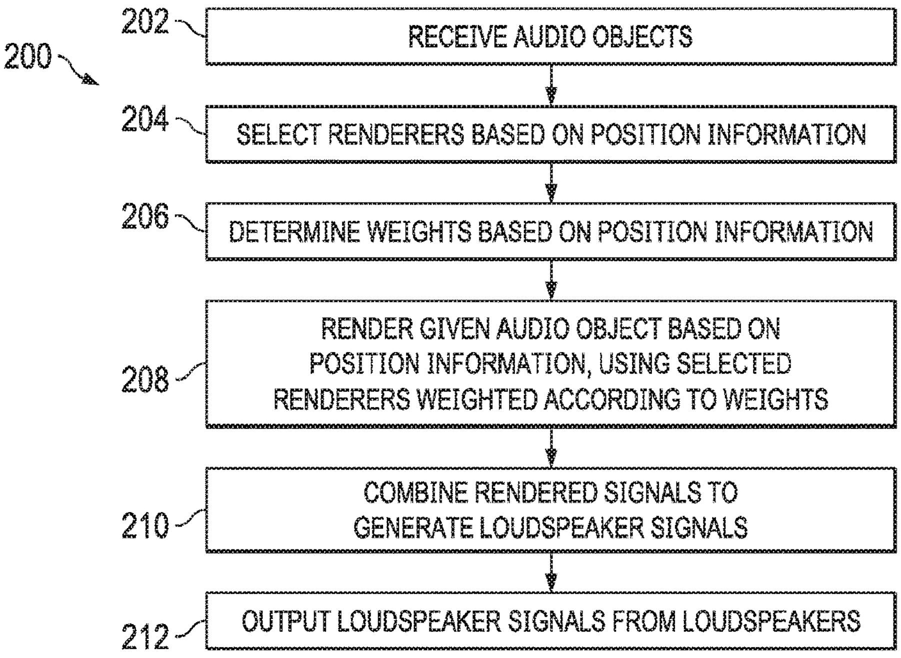
FIG. 2 is a flowchart of a method 200 of audio processing.

FIG. 2 is a flowchart of a method 200 of audio processing. The method 200 may be performed by the rendering system 100 (see FIG. 1). The method 200 may be implemented by one or more computer programs, for example that the rendering system 100 executes to control its operation.

At 202, one or more audio objects are received. Each of the audio objects respectively includes position information. (For example, two audio objects A and B may have respective position information PA and PB.) As an example, the rendering system 100 (see FIG. 1) may receive one or more audio objects in the audio signal 150. For each of the audio objects, the method continues with 204.

At 204, for a given audio object, at least two renderers are selected based on the position information of the given audio object. Optionally, the at least two renderers have at least two categories. (Of course, a particular audio object may be rendered using a single category of renderer; such a situation operates similarly to the multiple category situation discussed herein.) For example, when the position information indicates that a particular two renderers (having a particular two categories) would be appropriate for rendering that audio object, then those two renderers are selected. The renderers may be selected based on the loudspeaker configuration information 156 (see FIG. 1). As an example, the distribution module 110 may generate the selection information 162 to select at least two of the renderers 120, based on the position information in the object metadata 152 and the loudspeaker configuration information 156.

At 206, for the given audio object, at least two weights are determined based on the position information. The weights are related to the renderers selected at 204. As an example, the distribution module 110 (see FIG. 1) may generate the position information 164 (corresponding to the weights) based on the position information in the object metadata 152 and the loudspeaker configuration information 156.

At 208, the given audio object is rendered, based on the position information, using the selected renderers (see 204) weighted according to the weights (see 206), to generate a plurality of rendered signals. As an example, the renderers 120 (see FIG. 1, selected according to the selection information 162) generate the rendered signals 166 from the object audio data 154, weighted according to the position information 164. Continuing the example, when the renderers 120*a* and 120*b* are selected, the rendered signals 166*a* and 166*b* are generated.

At 210, the plurality of rendered signals (see 208) are combined to generate a plurality of loudspeaker signals. For a given loudspeaker, the corresponding rendered signals 166 are summed to generate the loudspeaker signal. The loudspeaker signals may be attenuated when above a maximum signal level, in order to prevent overloading a given loudspeaker. As an example, the routing module 130 may combine the rendered signals 166 to generate the loudspeaker signals 170.

At 212, the plurality of loudspeaker signals (see 210) are output from a plurality of loudspeakers.

When multiple audio objects are to be output concurrently, the method 200 operates similarly. For example, multiple given audio objects may be processed using multiple paths of 204-206-208 in parallel, with the rendered signals corresponding to the multiple audio objects being combined (see 210) to generate the loudspeaker signals.

Figure 3:
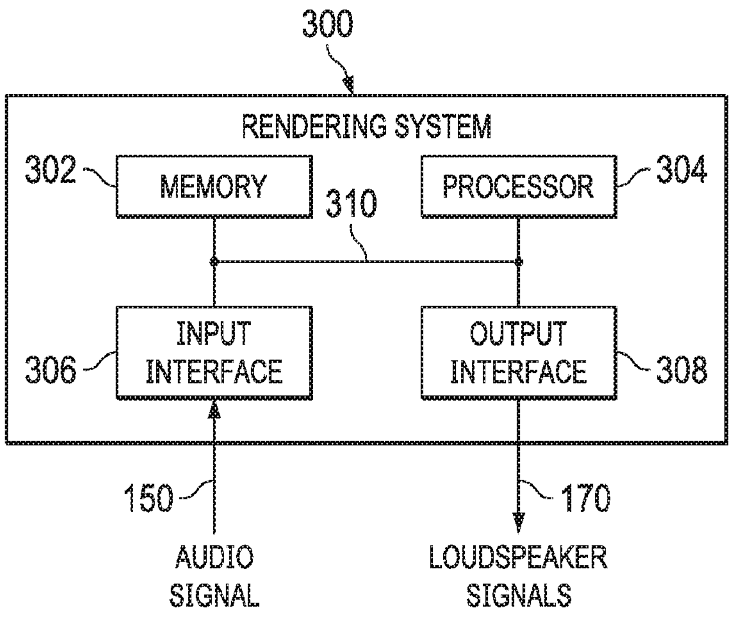
FIG. 3 is a block diagram of a rendering system 300.

FIG. 3 is a block diagram of a rendering system 300. The rendering system 300 may be used to implement the rendering system 100 (see FIG. 1) or to perform one or more of the steps of the method 200 (see FIG. 2). The rendering system 300 may store and execute one or more computer programs to implement the rendering system 100 or to perform the method 200. The rendering system 300 includes a memory 302, a processor 304, an input interface 306, and an output interface 308, connected by a bus 310. The rendering system 300 may include other components that (for brevity) are not shown.

The memory 302 generally stores data used by the rendering system 300. The memory 302 may also store one or more computer programs that control the operation of the rendering system 300. The memory 302 may include volatile components (e.g., random access memory) and non-volatile components (e.g., solid state memory). The memory 302 may store the loudspeaker configuration information 156 (see FIG. 1) or the data corresponding to the other signals in FIG. 1, such as the object metadata 152, the object audio data 154, the rendered signals 166, etc.

The processor 304 generally controls the operation of the rendering system 300. When the rendering system 300 implements the rendering system 100 (see FIG. 1), the processor 304 implements the functionality corresponding to the distribution module 110, the renderers 120, and the routing module 130.

The input interface 306 receives the audio signal 150, and the output interface 308 outputs the loudspeaker signals 170.

Figure 4:
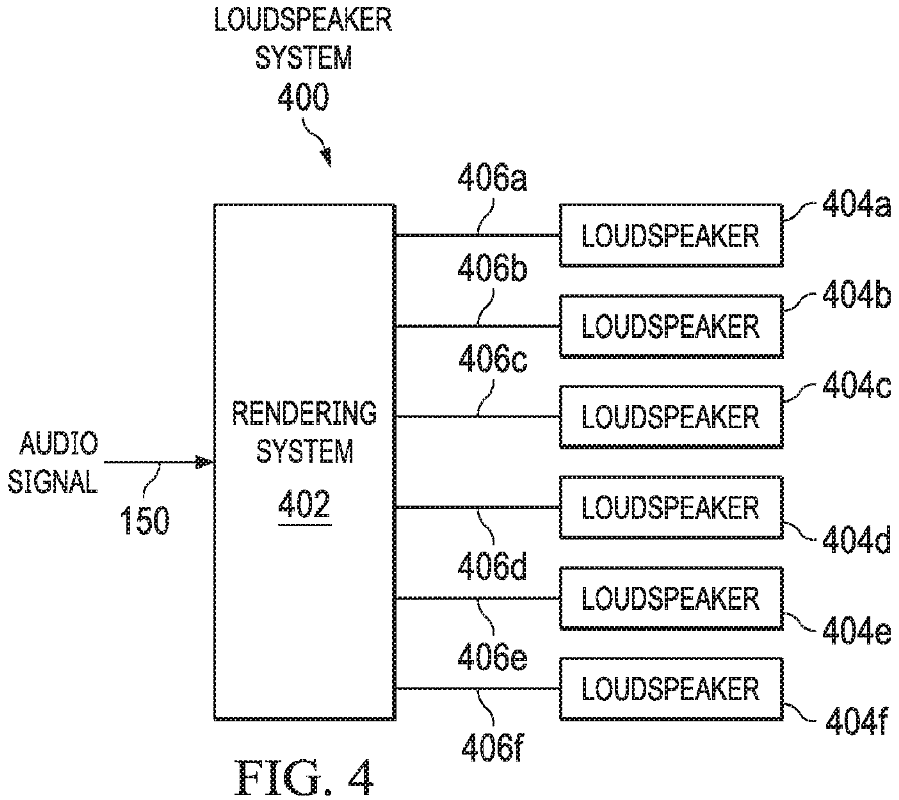
FIG. 4 is a block diagram of a loudspeaker system 400.

FIG. 4 is a block diagram of a loudspeaker system 400. The loudspeaker system 400 includes a rendering system 402 and a number of loudspeakers 404 (six shown, 404*a*, 404*b*, 404*c*, 404*d*, 404*e* and 404*f*). The loudspeaker system 400 may be configured as a single device that includes all of the components (e.g., a soundbar form factor). The loudspeaker system 400 may be configured as separate devices (e.g., the rendering system 402 is one component, and the loudspeakers 404 are one or more other components).

The rendering system 402 may correspond to the rendering system 100 (see FIG. 1), receiving the audio signal 150, and generating loudspeaker signals 406 that correspond to the loudspeaker signals 170 (see FIG. 1). The components of the rendering system 402 may be similar to those of the rendering system 300 (see FIG. 3).

The loudspeakers 404 output auditory signals (not shown) corresponding to the loudspeaker signals 406 (six shown, 406*a*, 406*b*, 406*c*, 406*d*, 406*e* and 406*f*). The loudspeaker signals 406 may correspond to the loudspeaker signals 170 (see FIG. 1). The loudspeakers 404 may output the loudspeaker signals as discussed above regarding 312 in FIG. 3.

Categories of Renderers

As mentioned above, the renderers (e.g., the renderers 120 of FIG. 1) are classified into various categories. Four general categories of renderers include sound field renderers, binaural renderers, panning renderers, and beamforming renderers. As discussed above (see 204 in FIG. 2), for a given audio object, the selected renderers have at least two categories. For example, based on the object metadata 152 and the loudspeaker configuration information 156 (see FIG. 1), the distribution module 110 may select a sound field renderer and a beamforming renderer (of the renderers 120) to render a given audio object.

Additional details of the four general categories of renderers are provided below. Note that where a category includes sub-categories of renderers, it is to be understood that the references to different categories of renderers are similar applicable to different sub-categories of renderers. The rendering systems described herein (e.g., the rendering system 100 of FIG. 1) may implement one or more of these categories of renderers.

Sound Field Renderers

In general, sound field rendering aims to reproduce a specific acoustic pressure (sound) field in a given volume of space. Sub-categories of sound field renderers include wave field synthesis, near-field compensated high-order Ambisonics, and spectral division.

One important capability of sound field rendering methods is the ability to project virtual sources in the near field, meaning generate sources that the listener will be localized at a position between himself and the speakers. While such effect is possible also for binaural renderers (see below), the particularity here is that the correct localization impression can be generated over a wide listening area.

Binaural Renderers

Binaural rendering methods focus on delivering to the listener's ears a signal carrying along the source signal processed to mimic the binaural cues associated with the source location. While the simpler way to deliver such signals is commonly over headphones, it can be successfully done over a speaker system as well, through the use of crosstalk cancellers in order to deliver individual left and right ear feeds to the listener.

Panning Renderers

Panning methods make direct use of the basic auditory mechanisms (e.g., changing interaural loudness and temporal differences) to move sound images around through delay and/or gain differentials applied to the source signal before being fed to multiple speakers. Amplitude panners, which use only gain differentials, are popular due to their simple implementation and stable perceptual impressions. They have been deployed in many consumer audio systems such as stereo systems and traditional cinema content rendering. (An example of a suitable amplitude panner design for arbitrary speaker arrays is provided by V. Pulkki, "Virtual sound source positioning using vector base amplitude panning," Journal of the Audio Engineering Society, vol. 45, no. 6, pp. 456-466, 1997.) Finally, methods that use reflections from the reproduction environment generally rely on similar principles to manipulate the spatial impression from the system.

Beamforming Renderers

Beamforming was originally designed for sensor arrays (e.g., microphone arrays), as a means to amplify the signal coming from a set of preferred directions. Thanks to the principle of reciprocity in acoustics, the same principle can be used to create directional acoustic signals. U.S. Pat. No. 7,515,719 describes the use of beamforming to create virtual speakers through the use of focused sources.

Rendering System Considerations

The rendering system categories discussed above have a number of considerations regarding the sweet spot and the source location to be rendered.

The sweet spot generally corresponds to the space where the rendering is considered acceptable according to a listener perception metric. While the exact extent of such area is generally imperfectly defined due to the absence of analytic metrics capturing well the perceptual quality of the rendering, it is generally possible to derive qualitative information from typical error metrics (e.g., square error), and compare different systems in different configurations. For example, a common observation is that the sweet spot is smaller (for all categories of renderers) at higher frequencies. Generally, it can also be observed that the sweet spot grows with the number of speakers available in the system, except for panning methods, for which the addition of speakers has different advantages.

The different rendering system categories may also vary in the way and capabilities they have to deliver audio to be perceived at various source locations. Sound field rendering methods generally allow for the creation of virtual sources anywhere in the direction of the speaker array from the point of view of the listener. One aspect of those methods is that they allow for the manipulation of the perceived distance of the source in a transparent way and from the perspective of the entire listening area. Binaural rendering methods can theoretically deliver any source locations in the sweet spot, as long as the binaural information related to those positions has been previously stored. Finally, the panning methods can deliver any source direction for which a pair/trio of speakers sufficiently close (e.g., approximately 60 degree angle such as between 55-65 degrees) is available from the point of view of the listener. (However, panning methods generally do not define specific ways to handle source distance, so additional strategies need to be used if a distance component is desired.)

In addition, some rendering system categories exhibit an interdependence between the source location and the sweet spot. For example, for a linear array of loudspeakers implementing a wave field synthesis process (in the sound field rendering category), a source location in the center behind the array may be perceived in a large sweet spot in front of the array, whereas a source location in front of the array and displaced to the side may be perceived in a smaller, off-center sweet spot.

Detailed Embodiments

Given the above considerations, embodiments are directed toward using two or more rendering methods in combination, where the relative weight between the selected rendering methods depends on the audio object location.

With the increasing availability of hardware allowing for the use of large number of speakers in consumer applications, the possibility of using complex rendering strategies becomes more and more appealing. Indeed, the number of speakers still remains limited so that using a single rendering method generally leads to strong limitations, generally with regard to the sweet spot extent. Additionally, complex strategies can potentially deal with complex speaker setups, for example some missing surround coverage in some region, or just lacking speaker density. However, the standard limitations of those reproduction methods remain, leading to the necessary compromise between coverage (the largest array possible to have a wider range of possible source locations) and density (the densest array possible to avoid as much as possible high frequency distortion due to aliasing) for a given number of channels.

In view of the above issues, embodiments are directed to using multiple types of renderers driven together to render object-based audio content. For example, in the rendering system 100 (see FIG. 1), the distribution module 110 processes the object-based audio content based on the object metadata 152 and the loudspeaker configuration information 156 in order to determine (1) which of the renderers 120 to activate (the selection information 162), and (2) the source position to be rendered by each activated renderer (the position information 164). Each selected renderer then renders the object audio data 154 according to the position information 164 and generates the rendered signals 166 that the routing module 130 routes to the appropriate loudspeaker in the system. The routing module 130 allows the use of a given loudspeaker by multiple renderers. In this manner, the rendering system 100 uses the distribution module 110 to distribute each audio object to the renderers 120 that will effectively convey the intended spatial impression in the desired listening area.

For a system at K speakers (k=1 . . . K), rendering 0 objects (o=1 . . . 0) with R distinct renderers (r=1 . . . R), the output s of each speaker k is given by:

$$s_k(t) = \sum_{o=1}^{O}\sum_{r=1}^{R} w_r(\vec{x}_o) * \left[\delta_{k\in r} D_k^{(r)}(\vec{x}_r^{(o)}) * s_o(t)\right]$$

In the above equation:

$s_k$ (t): output signal from speaker k $s_o$(t): object signal $w_r$: activation of renderer r as a function of the object position $\vec{x}_o$ (can be a real scalar or a real filter)

$\delta_{k\in r}$: indicator function, is 1 if speaker k is attached to renderer r, 0 otherwise $D_k^{(r)}$: driving function of speaker k as directed by renderer r as a function of an object position $\vec{x}_r^{(o)}$ (can be a real scalar or a real filter)

$\vec{x}_o$: object position according to its metadata $\vec{x}_r^{(o)}$: object position used to drive renderer r for object o (can be equal to $\vec{x}_0$)

The type of renderer for renderer r is reflected in the driving function $D_k^{(r)}$. The specific behavior of a given renderer is determined by its type and the available setup of speakers it is driving (as determined by $\delta_{k\in r}$). The distribution of a given object among the renderers is controlled by the distribution algorithm, through the activation coefficient $w_r$ and the mapping $\vec{x}_r^{(o)}$ of a given object o in the space controlled by renderer r.

Applying the above equation to the rendering system 100 (see FIG. 1), each $s_k$ corresponds to one of the loudspeaker signals 170, $s_o$ corresponds to the object audio data 154 for a given audio object, $w_r$ corresponds to the selection information 162, $\delta_{k\in r}$ corresponds to the loudspeaker configuration information 156 (e.g., configuring the routings performed by the routing module 130), $D_k^{(r)}$ corresponds to a rendering function for each of the renderers 120, and $\vec{x}_o$ and $\vec{x}_r^{(o)}$ correspond to the position information 164. The combination of $w_r$ and $D_k^{(r)}$ may be considered to be weights that provide the relative weight between the selected renderers for the given audio object.

Although the above equation is written in the time domain, an example implementation may operate in the frequency domain, for example using a filter bank. Such an implementation may transform the object audio data 154 to the frequency domain, perform the operations of the above equation in the frequency domain (e.g., the convolutions become multiplications, etc.), and then inverse transform the results to generate the rendered signals 166 or the loudspeaker signals 170.

Figure 5A:
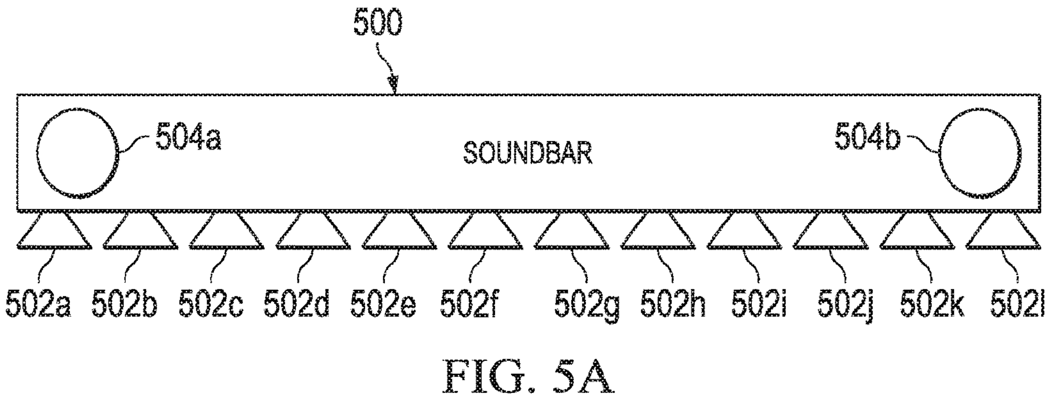
FIGS. 5A and 5B are respectively a top view and a side view of a soundbar 500.
Figure 5B:
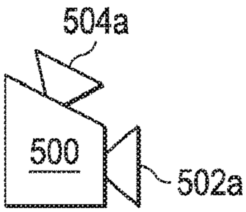

FIGS. 5A and 5B are respectively a top view and a side view of a soundbar 500. The soundbar 500 may implement the rendering system 100 (see FIG. 1). The soundbar 500 includes a number of loudspeakers including a linear array 502 (having 12 loudspeakers 502*a*, 502*b*, 502*c*, 502*d*, 502*e*, 502*f*, 502*g*, 502*h*, 502*i*, 502*j*, 502*k* and 502*l*) and an upward firing group 504 (including 2 loudspeakers 504*a* and 504*b*). The loudspeaker 502*a* may be referred to as the far left loudspeaker, the loudspeaker 502*l* may be referred to as the far right loudspeaker, the loudspeaker 504*a* may be referred to as the upward left loudspeaker, and the loudspeaker 504*b* may be referred to as the upward right loudspeaker. The number of loudspeakers and their arrangement may be adjusted as desired.

The soundbar 500 is suitable for consumer use, for example in a home theater configuration, and may receive its input from a connected television or audio/video receiver. The soundbar 500 may be placed above or below the television screen, for example.

Figure 6A:
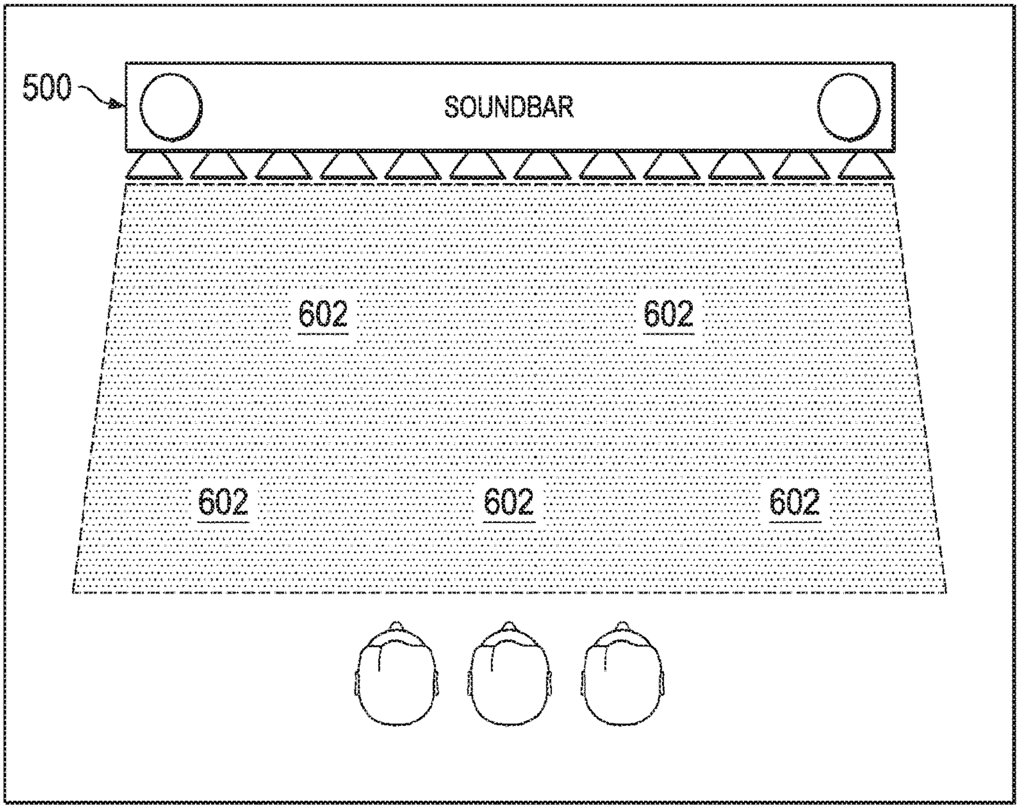
FIGS. 6A, 6B and 6C are respectively a first top view, a second top view and a side view showing the output coverage for the soundbar 500 (see FIGS. 5A and 5B) in a room.
Figure 6B:
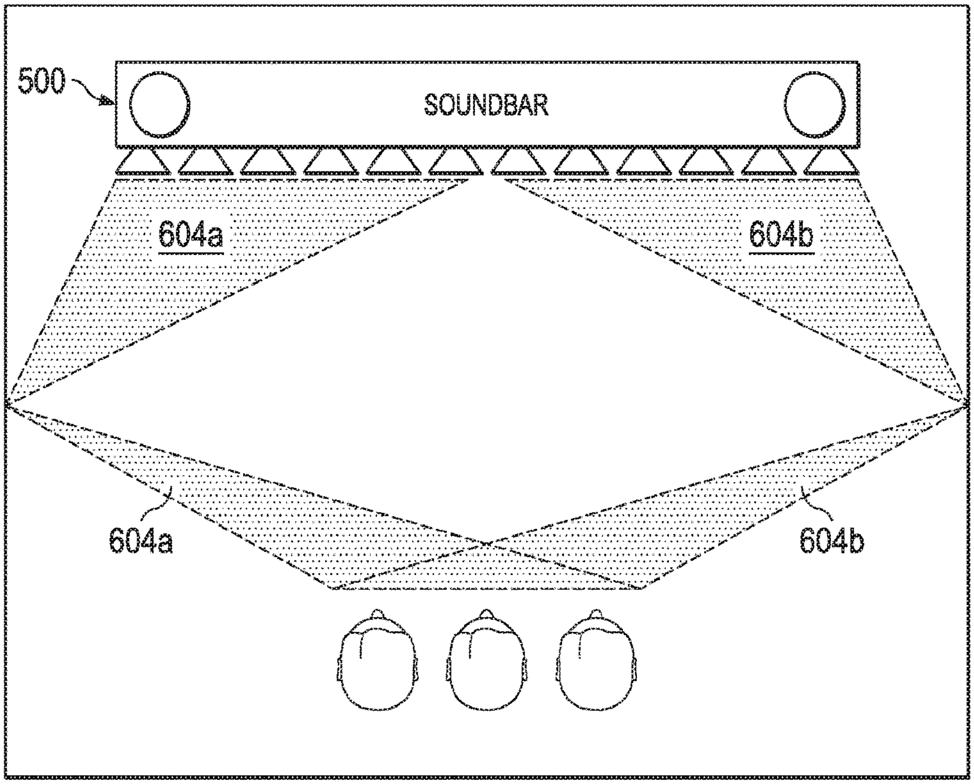
Figure 6C:
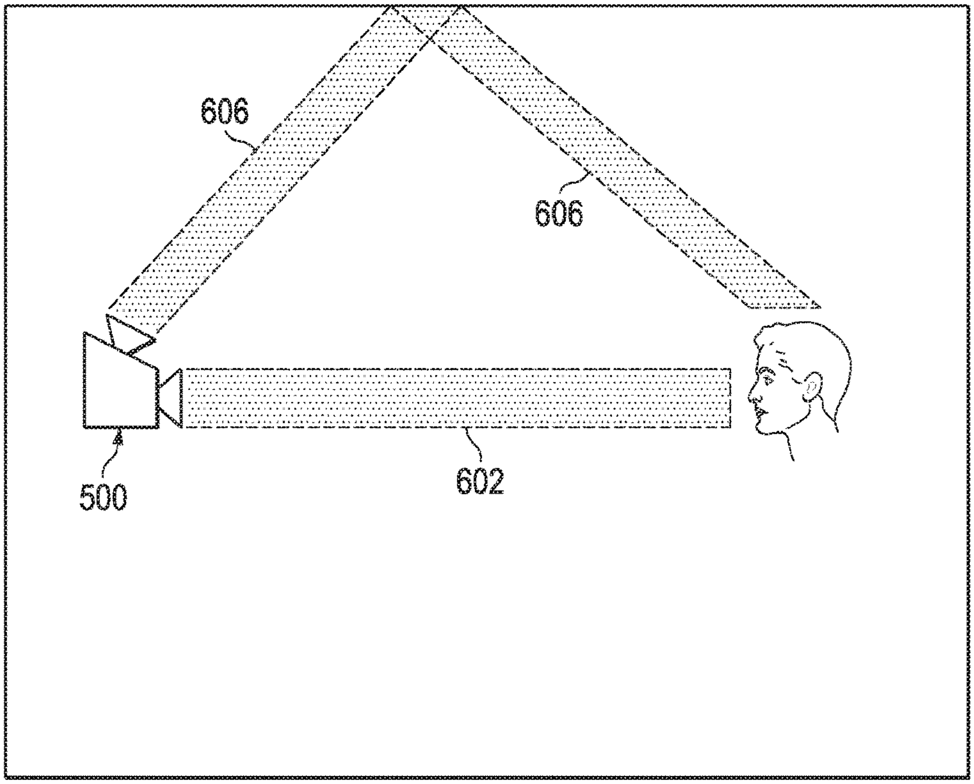

FIGS. 6A, 6B and 6C are respectively a first top view, a second top view and a side view showing the output coverage for the soundbar 500 (see FIGS. 5A and 5B) in a room. FIG. 6A shows a near field output 602 generated by the linear array 502. The near field output 602 is generally projected outward from the front of the linear array 502. FIG. 6B shows a virtual side outputs 604*a* and 604*b* generated by the linear array 502 using beamforming. The virtual side outputs 604*a* and 604*b* result from beamforming against the walls. FIG. 6C shows a virtual top output 606 generated by the upward firing group 504. (Also shown is the near field output 602 of FIG. 6A, generally in the plane of the listener.) The virtual top output 606 results from reflecting against the ceiling. For a given audio object, the soundbar 500 may combine two or more of these outputs together, e.g. using a routing module such as the routing module 130 (see FIG. 1), in order to conform the audio object's perceived position with its position metadata.

Figure 7:
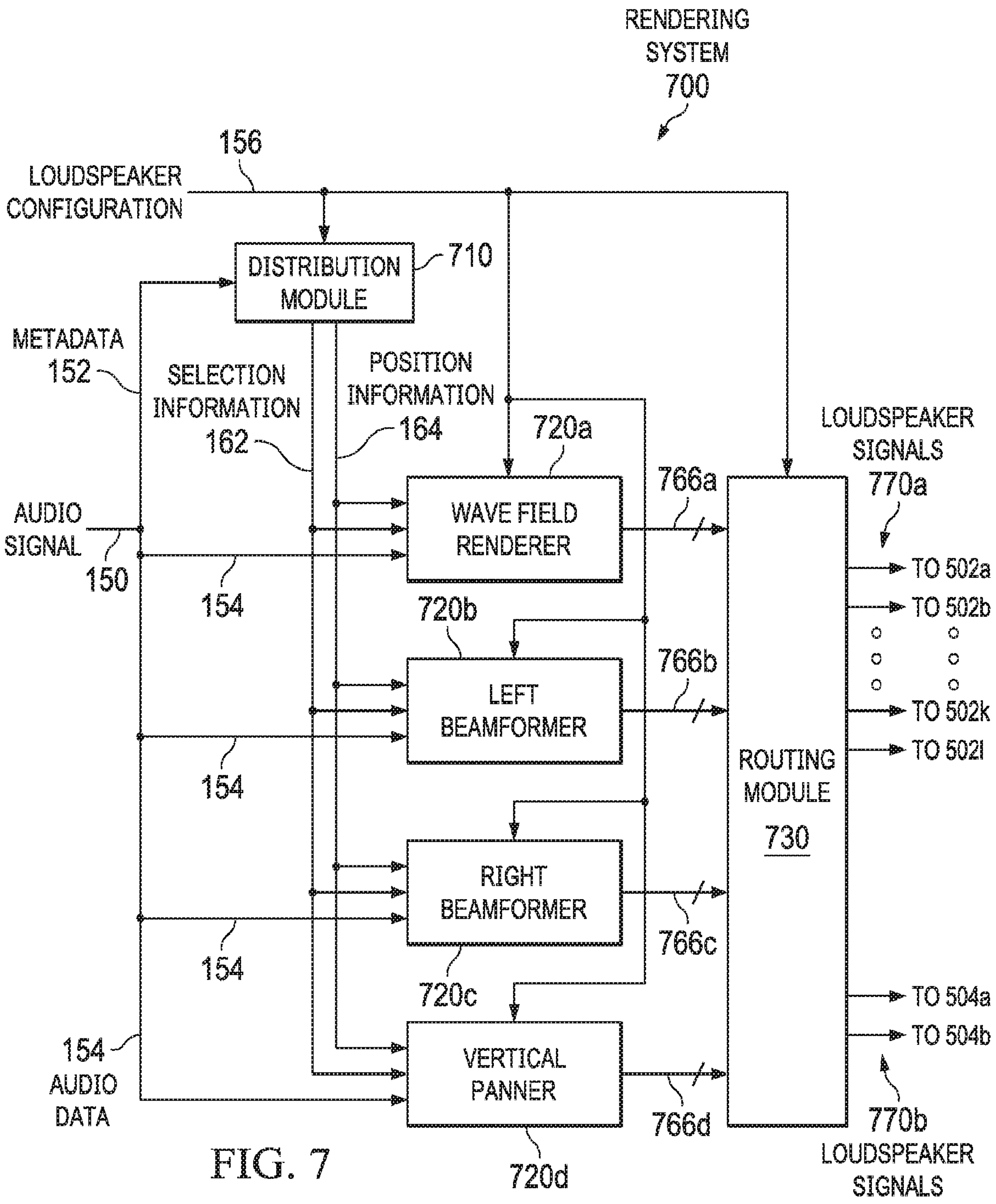
FIG. 7 is a block diagram of a rendering system 700.

FIG. 7 is a block diagram of a rendering system 700. The rendering system 700 is a specific embodiment of the rendering system 100 (see FIG. 1) suitable for the soundbar 500 (see FIG. 5A). The rendering system 700 may be implemented using the components of the rendering system 300 (see FIG. 3). As with the rendering system 100, the rendering system 700 receives the audio signal 150. The rendering system 700 includes a distribution module 710, four renderers 720*a*, 720*b*, 720*c* and 720*d* (collectively the renderers 720), and a routing module 730.

The distribution module 710, in a manner similar to the distribution module 110 (see FIG. 1), receives the object metadata 152 and the loudspeaker configuration information 156, and generates the selection information 162 and the position information 164.

The renderers 720 receive the object audio data 154, the loudspeaker configuration information 156, the selection information 162 and the position information 164, and generate rendered signals 766*a*, 766*b*, 766*c* and 766*d* (collectively the rendered signals 766). The renderers 720 otherwise function similarly to the renderers 120 (see FIG. 1). The renderers 720 include a wave field renderer 720*a*, a left beamformer 720*b*, a right beamformer 720*c*, and a vertical panner 720*d*. The wave field renderer 720*a* generates the rendered signals 766*a* corresponding to the near field output 602 (see FIG. 6A). The left beamformer 720*b* generates the rendered signals 766*b* corresponding to the virtual side output 604*a* (see FIG. 6B). The right beamformer 720*c* generates the rendered signals 766*c* corresponding to the virtual side output 604*b* (see FIG. 6B). The vertical panner 720*d* generates the rendered signals 766*d* corresponding to the virtual top output 606 (see FIG. 6C).

The routing module 730 receives the loudspeaker configuration information 156 and the rendered signals 766, and combines the rendered signals 766 in a manner similar to the routing module 130 (see FIG. 1) to generate loudspeaker signals 770*a* and 770*b* (collectively the loudspeaker signals 770). The routing module 730 combines the rendered signals 766*a*, 766*b* and 766*c* to generate the loudspeaker signals 770*a* that are provided to the loudspeakers of the linear array 502 (see FIG. 5A). The routing module 730 routes the rendered signals 766*d* to the loudspeakers of the upward firing group 504 (see FIG. 5A) as the loudspeaker signals 770*b*.

As an audio object's perceived position changes across the listening environment, the distribution module 710 performs cross-fading (using the position information 164) among the various renderers 720 to result in smooth perceived source motion between the different regions of FIGS. 6A, 6B and 6C.

Figure 8A:
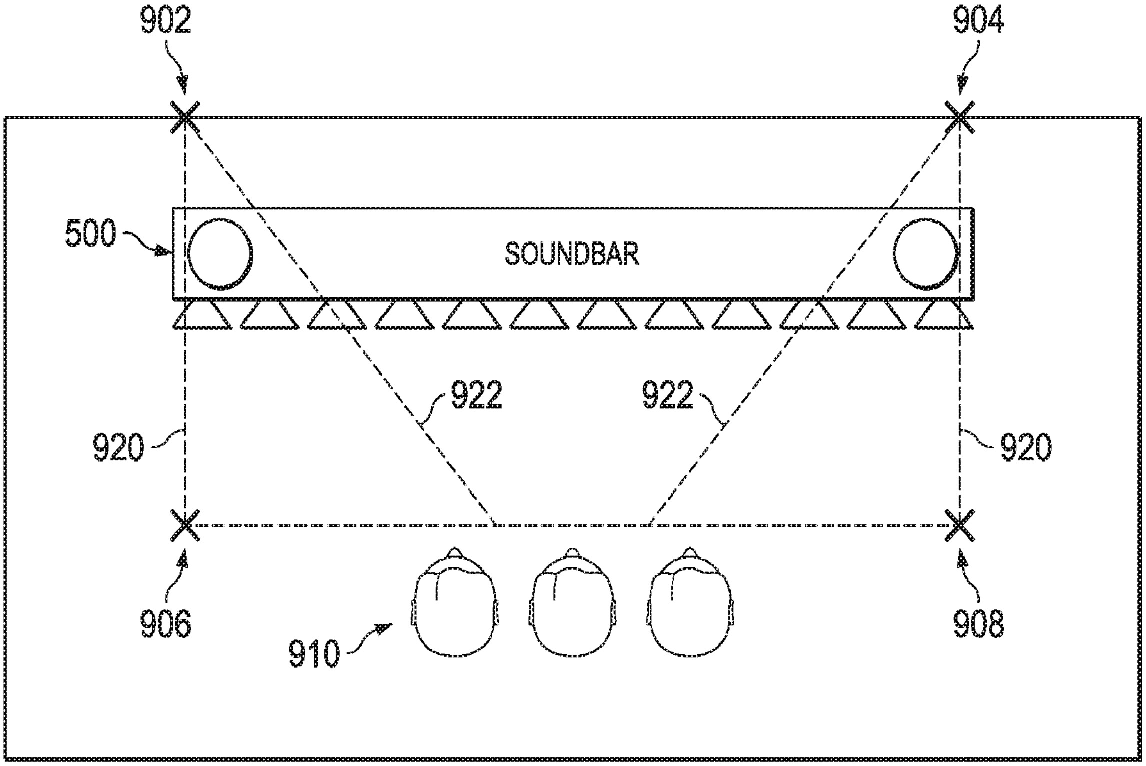
FIGS. 8A and 8B are respectively a top view and a side view showing an example of the source distribution for the soundbar 500 (see FIG. 5A).
Figure 8B:
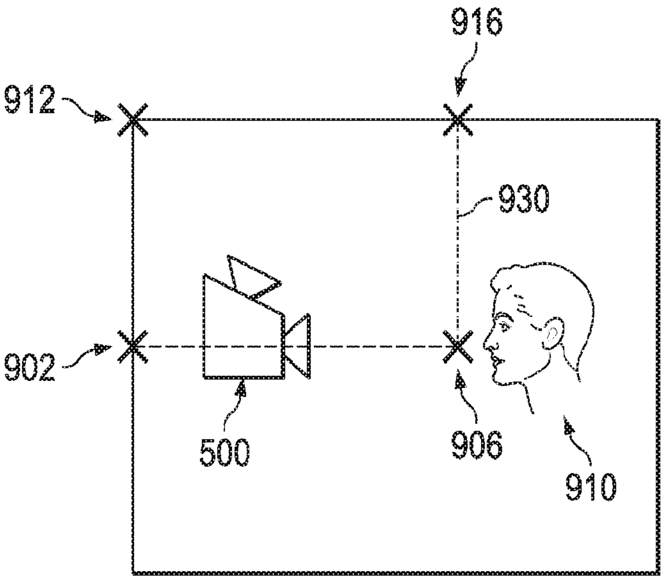

FIGS. 8A and 8B are respectively a top view and a side view showing an example of the source distribution for the soundbar 500 (see FIG. 5A). For a particular audio object in the audio signal 150 (see FIG. 1), the object metadata 152 defines a desired perceived position within a virtual cube of size 1×1×1. This virtual cube is mapped to a cube in the listening environment, e.g. by the distribution module 110 (see FIG. 1) or the distribution module 710 (see FIG. 7) using the position information 164.

FIG. 8A shows the horizontal plane (x,y), with the point 902 at (0,0), point 904 at (1,0), point 906 at (0,–0.5), and point 908 at (1,–0.5). (These points are marked with the "X".) The perceived position of the audio object is then mapped from the virtual cube to the rectangular area 920 defined by these four points. Note that this plane is only half the virtual cube in this dimension, and that sources where y>0.5 (e.g., behind the listener positions 910) are placed on the line between the points 906 and 908, in front of the listener positions 910. The points 902 and 904 may be considered to be at the front wall of the listening environment. The width of the area 920 (e.g., between points 902 and 904) is roughly aligned with (or slightly inside of) the sides of the linear array 502 (see also FIG. 5A).

FIG. 8B shows the vertical plane (x,z), with the point 902 at (0,0), point 906 at (–0.5,0), point 912 at (0,1), and point 916 at (–0.5,1). The perceived position of the audio object is then mapped from the virtual cube to the rectangular area 930 defined by these four points. As with FIG. 8A, in FIG. 8B sources where y>0.5 (e.g., behind the listener positions 910) are placed on the line between the points 906 and 916. The points 912 and 916 may be considered to be at the ceiling of the listening environment. The bottom of the area 930 is aligned at the level of the linear array 502.

In FIG. 8A, note the trapezoid 922 in the horizontal plane, with its wide base aligned with one side of the area 920 between points 902 and 904, and its narrow base aligned in front of the listener positions 910 (on the line between points 906 and 908). The system distinguishes sources with desired perceived positions inside the trapezoid 922 from those outside the trapezoid 922 (but still within the area 920). Within the trapezoid 922, the source is reproduced without using the beamformers (e.g., 720*b* and 720*c* in FIG. 7); instead, the sound field renderer (e.g., 720*a* in FIG. 7) is used to reproduce the source. Outside the trapezoid 922, the source may be reproduced using both the beamformers (e.g., 720*b* and 720*c*) and the sound field renderer (e.g., 720*a*) in the horizontal plane. In particular, the sound field renderer 720*a* places a source at the same coordinate y, at the very left of the trapezoid 922, if the source is located on the left (or the very right if the source is located on the right), while the two beamformers 720*b* and 720*c* create a stereo phantom source between each other through panning. The left-right panning factor between the two beamformers 720*b* and 720*c* may follow a constant energy amplitude panning rule mapping x=0 to the left beamformer 720*b* only and x=1 to the right beamformer 720*c* only. (The distribution module 710 may use the position information 164 to implement this amplitude panning rule, e.g., using the weights.) The system applies a constant-energy cross-fading rule between the sound field renderer 720*a* and the pair of beamformers 720*b*-720*c*, so that the sound energy from the beamformers 720*b*-720*c* increases while the sound energy from the sound field renderer 720*a* decreases as the source is placed further from the trapezoid 922. (The distribution module 710 may use the position information 164 to implement this cross-fading rule.)

In the z dimension (see FIG. 8B), the system applies a constant-energy cross-fade rule between the signal fed to the combination of the beamformers 720*b*-720*c* and the sound field renderer 720*a*, and the rendered signals 766*d* rendered by the vertical panner 720*d* that are fed to the upward firing group 504 (see FIGS. 5A and 5B). The cross-fade factor is proportional to the z coordinate, with z=0 corresponding to all of the signal being rendered through the beamformers 720*b*-720*c* and the sound field renderer 720*a*, and z=1 corresponding to all of the signal being rendered using the vertical panner 720*d*. The rendered signal 766*d* produced by the vertical panner 720*d* is distributed between the two channels (to the two loudspeakers 504*a* and 504*b*) using a constant-energy amplitude panning rule, mapping x=0 to the left loudspeaker 504*a* only and x=1 to the right loudspeaker 504*b* only. (The distribution module 710 may use the position information 164 to implement this amplitude panning rule.)

Figure 9A:
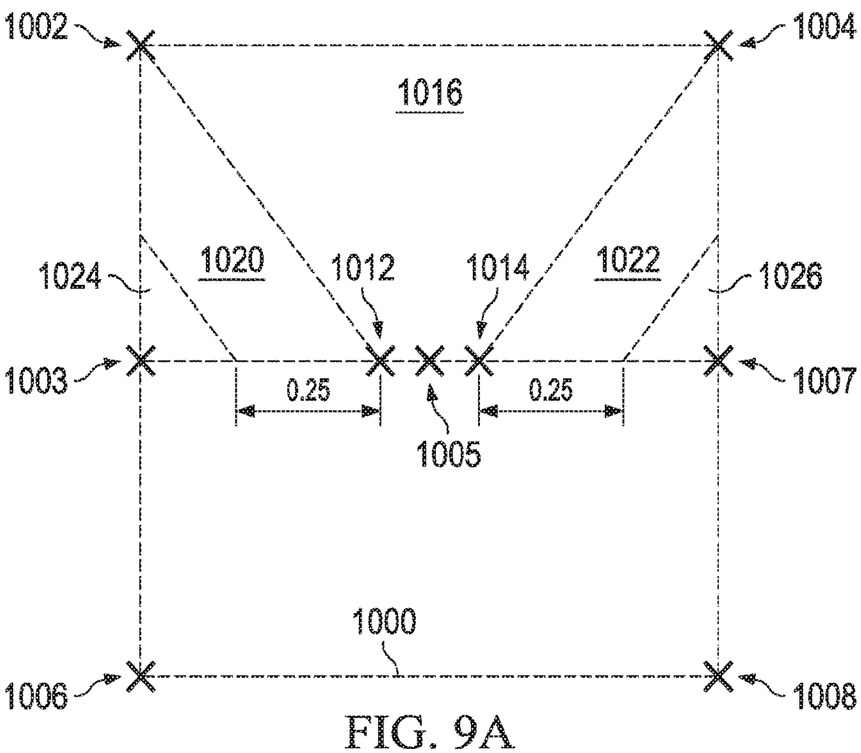
FIGS. 9A and 9B are top views showing a mapping of object-based audio (FIG. 9A) to a loudspeaker array (FIG. 9B).
Figure 9B:
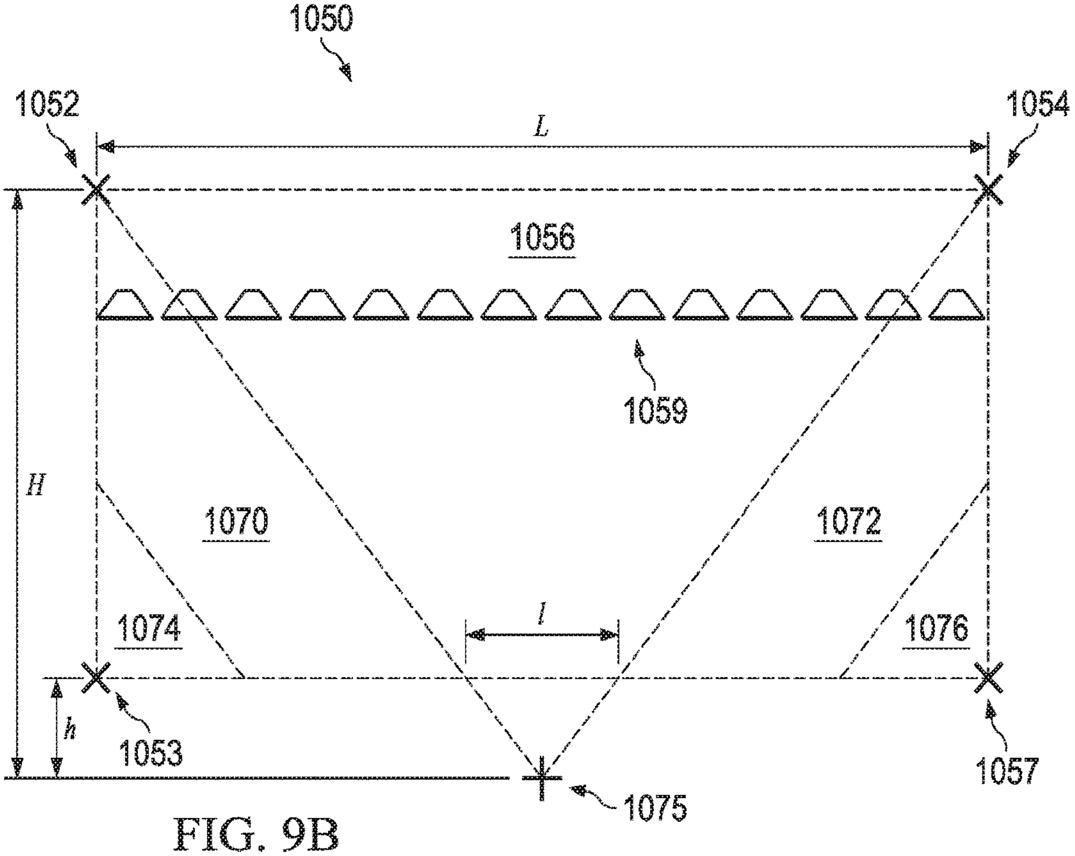

FIGS. 9A and 9B are top views showing a mapping of object-based audio (FIG. 9A) to a loudspeaker array (FIG. 9B). FIG. 9A shows a horizontal square region 1000 defined by point 1002 at (0,0), point 1004 at (1,0), point 1006 at (0,1), and point 1008 at (1,1). Point 1003 is at (0,0.5), at the midpoint between points 1002 and 1006, and point 1007 is at (1,0.5), at the midpoint between points 1004 and 1008. Point 1005 is at (0.5,0.5), the center of the square region 1000. Points 1002, 1004, 1012 and 1014 define a trapezoid 1016. Adjacent to the sides of the trapezoid 1016 are two zones 1020 and 1022, which have a width of 0.25 units in the specified x direction. Adjacent to the sides of the zones 1020 and 1022 are the triangles 1024 and 1026. An audio object may have a desired perceived position within the square region 1000 according to its metadata (e.g., the object metadata 152 of FIG. 1). An example object audio system that uses the horizontal square 1000 is the Dolby Atmos® system.

FIG. 9B shows the mapping of a portion of the square region 1000 (see FIG. 9A) to a region 1050 defined by points 1052, 1054, 1053 and 1057. Note that only half of the square region 1000 (defined by the points 1002, 1004, 1003 and 1007) is mapped to the region 1050; the perceived positions in the other half of the square region 1000 are mapped on the line between points 1053 and 1057. (This is similar to what was described above in FIG. 8A.) A loudspeaker array 1059 is within the region 1050; the width of the loudspeaker array 1059 corresponds to the width L of the region 1050. Similarly to the square region 1000 (see FIG. 9A), the region 1050 includes a trapezoid 1056, two zones 1070 and 1072 adjacent to the sides of the trapezoid 1056, and two triangles 1074 and 1076. The zones 1070 and 1072 correspond to the zones 1020 and 1022 (see FIG. 9A), and the triangles 1074 and 1076 correspond to the triangles 1024 and 1026 (see FIG. 9A). A wide base of the trapezoid 1056 corresponds to the width L of the region 1050, and a narrow base corresponds to a width l. The height of the trapezoid 1056 is (H–h), where H corresponds to a large triangle that includes the trapezoid 1056 and extends from the wide base (having width L) to a point 1075, and h corresponds to the height of a small triangle that extends from the narrow base (having width l) to the point 1075. As will be detailed more below, within the zones 1070 and 1072, the system implements a constant-energy cross-fading rule between the categories of renderers.

More precisely, the output of the loudspeaker array 1059 (see FIG. 9B) may be described as follows. The loudspeaker array 1059 has M speakers (m=1, . . . , M from left to right). Those speakers are driven as follows:

$$s_m(t) = \sum_{o=1}^{O} s_o(t) * \sin z_o \cdot \left[\sin(\theta_{NF}(x_o, y_o)) \cdot D_m^{NF}\left(x_{NF}^{(o)}, y_{NF}^{(o)}\right) + \cos(\theta_{NF}(x_o, y_o)) \cdot D_m^B\right]$$

The factor $\theta_{NF/B}(x_o,y_o)$ drives the balance between the near-field wave field synthesis renderer 720$a$ and the beamformers 720$b$-720$c$ (see FIG. 7). It is defined using the notation presented in FIG. 9B for the trapezoid 1056, so that for $y_0 \leq ½$:

$$\begin{cases} \theta_{NF/B}(x_o, y_o) = 1, & \text{if } \left|x_o - \frac{1}{2}\right| < \frac{1}{2} - y_o\frac{L-l}{L} \\ \theta_{NF/B}(x_o, y_o) = |4x_o - 2| - 2 + 4y_0\frac{L-l}{L}, & \text{if } \left|x_o - \frac{1}{2}\right| \in \left[\frac{1}{2} - y_o\frac{L-l}{L}, \frac{3}{4} - y_o\frac{L-l}{L}\right] \\ \theta_{NF/B}(x_o, y_o) = 0, & \text{if } \left|x_o - \frac{1}{2}\right| > \frac{3}{4} - y_o\frac{L-l}{L} \end{cases}$$

Then, for $y_0 > ½$:

$$\theta_{NF/B}(x_o,y_o)=|4x_0-2|-2l/L$$

The positioning of the sources in the near-field, using the wave field renderer 720$a$, follows the rule:

$$x_{NF}^{(o)} = x_o\frac{l}{L} \text{ and } y_{NF}^{(o)} = \min\left(y_o, \frac{1}{2}\right) \cdot H$$

The driving functions are written in the frequency domain. For sources behind the array plane (e.g., behind the loudspeaker array 1059 such as on the line between points 1052 and 1054):

$$D_m^{NF}\left(\vec{x}_{NF}^{(o)}; \omega\right) = \alpha\left(\vec{x}_{NF}^{(o)}; \vec{x}_1\right) \cdot EQ_m(\omega) \cdot PreEQ\left(\vec{x}_{NF}^{(o)}; \omega\right) \cdot \underbrace{\frac{e^{-\frac{j\omega}{c}\left\|\vec{x}_m - \vec{x}_{NF}^{(o)}\right\|_2}}{\left\|\vec{x}_m - \vec{x}_{NF}^{(o)}\right\|_2^{3/2}}}_{\text{WFS driving function}} \quad (1)$$

with $\vec{x}_{NF}^{(o)}=(x_{NF}^{(o)},y_{NF}^{(o)},0)$ and c speed of sound.

And in front of the array plane (e.g., in front of the loudspeaker array 1059), note that only the last term changes:

$$D_m^{NF}\left(\vec{x}_{NF}^{(o)}; \omega\right) = \alpha\left(\vec{x}_{NF}^{(o)}; \vec{x}_1\right) \cdot EQ_m(\omega) \cdot PreEQ\left(\vec{x}_{NF}^{(o)}; \omega\right) \cdot \underbrace{\frac{e^{\frac{j\omega}{c}\left\|\vec{x}_m - \vec{x}_{NF}^{(o)}\right\|_2}}{\left\|\vec{x}_m - \vec{x}_{NF}^{(o)}\right\|_2^{3/2}}}_{\text{WFS driving function}} \quad (2)$$

with $\vec{x}_{NF}^{(o)}=(x_{NF}^{(o)},y_{NF}^{(o)},0)$

In these expressions, the last term corresponds to the amplitude and delay control values in the 2.5D Wave Field Synthesis theory for a localized sources in front and behind the array plane (e.g., defined by the loudspeaker array 1059). (An overview of Wave Field Synthesis theory is provided by H. Wierstorf, "Perceptual Assessment of Sound Field Synthesis," Technische Universitat Berlin, 2014.) The other coefficients are defined as follows:

ω: frequency (in rad/s)

α: window function, limits truncation artifacts and implement local wave field synthesis, as a function of source and listening positions.

$EQ_m$: equalization filter compensating for speaker response distortion.

PreEQ: pre-equalization filter compensating for 2.5-dimension effects and truncation effects.

$\vec{x}_l$: arbitrary listening position.

Regarding the beamformers 720$b$-720$c$, the system precomputes a set of M/2 speaker delays and amplitudes adapted to the configuration of the left half of the linear loudspeaker array 1059. In the frequency domain, it gives us filter coefficients $B_m(\omega)$ for each speaker m and frequency ω. The beamformer driving function for the left half of the speaker array (m=1 . . . M/2) is then a filter defined in the frequency domain as:

$$D_m^{NF}(\vec{x}_{NF}^{(o)};\omega)=EQ_m(\omega)\cdot B_m(\omega)$$

In the above equation, $EQ_m$ is the equalization filter compensating for speaker response distortion (same filter as in Equations (1) and (2)). The system is designed for a symmetric setup, so that we can just flip the beam filters for the right half of the array to obtain the other beam, so that for m=M/2 . . . M, we have:

$$D_m^{NF}(\vec{x}_{NF}^{(o)};\omega)=EQ_m(\omega)\cdot B_{M-m+1}(\omega)$$

The rendered signals 766$d$ (see FIG. 7), which correspond to the loudspeaker signals 770$b$ provided to the two upward firing speakers 504$a$-504$b$ (see FIG. 5), correspond to the signals $S_{UL}$ and $S_{UR}$ as follows:

$$\begin{cases} s_{UL}(t) = \sum_{o=1}^{O} \cos z_o \cdot \sin y_0 \cdot D_{UL}^H\left(z_H^{(o)}\right) * s_o(t) \\ s_{UR}(t) = \sum_{o=1}^{O} \cos z_o \cdot \cos y_0 \cdot D_{UR}^H\left(z_H^{(o)}\right) * s_o(t) \end{cases}$$

According to an embodiment, the vertical panner 720$d$ (see FIG. 7) includes a pre-filtering stage. The pre-filtering stage applies a height perceptual filter H proportionally to the height coordinate $z_0$. In such a case, the applied filter for a given $z_0$ is $$(1 - z_0) + z_0\frac{H}{2}.$$

Figure 10:
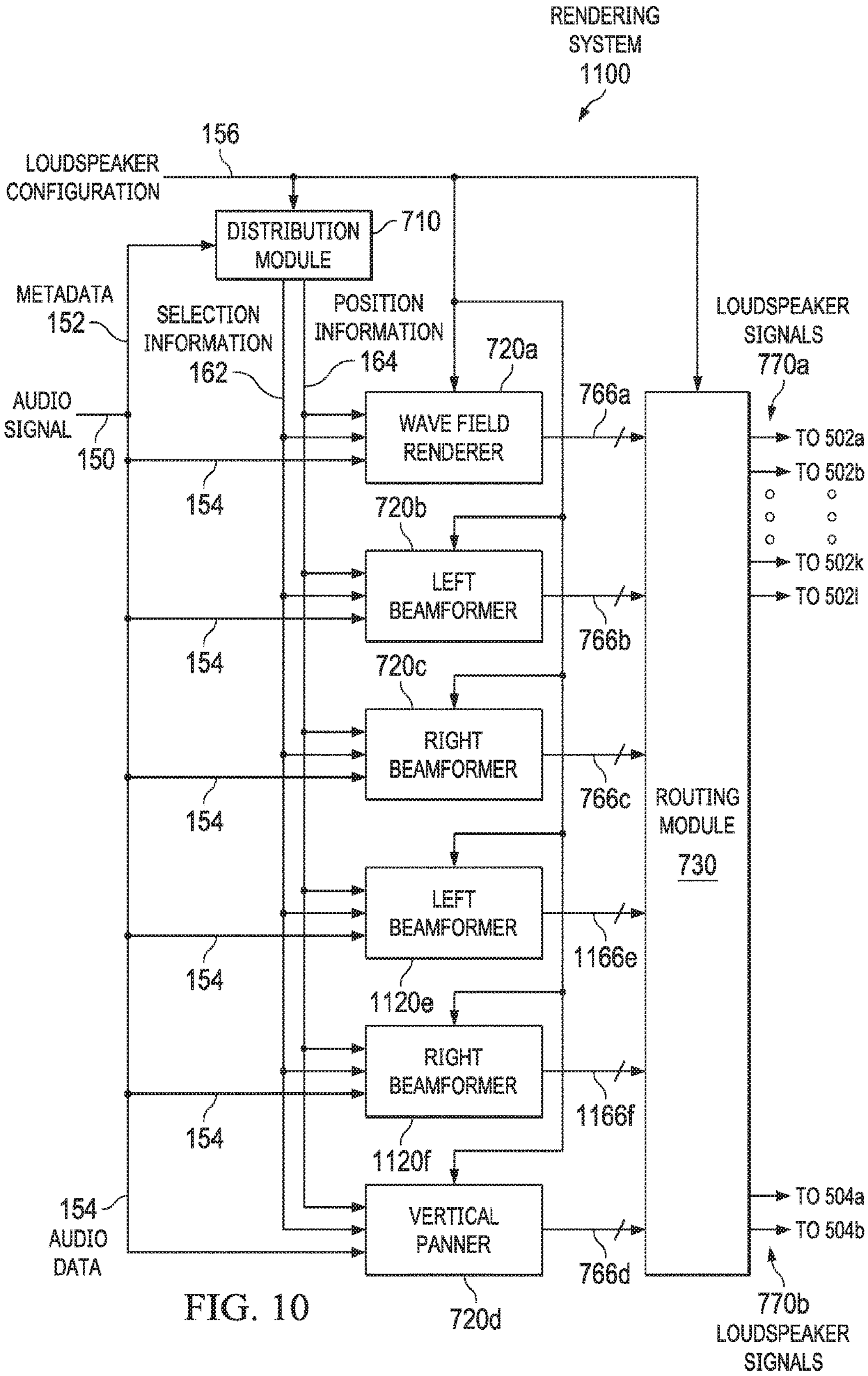
FIG. 10 is a block diagram of a rendering system 1100.

FIG. 10 is a block diagram of a rendering system 1100. The rendering system 1100 is a modification of the rendering system 700 (see FIG. 7) suitable for implementation in the soundbar 500 (see FIG. 5A). The rendering system 1100 may be implemented using the components of the rendering system 300 (see FIG. 3). The components of the rendering system 1100 are similar to those of the rendering system 700 and use similar reference numbers. The rendering system 1100 also includes a second pair of beamformers 1120*e* and 1120*f*. The left beamformer 1120*e* generates rendered signals 1166*d*, and the right beamformer 1120*f* generates rendered signals 1166*e*, which the routing module 730 combines with the other rendered signals 766*a*, 766*b* and 766*c* to generate the loudspeaker signals 770*a*. When their output is considered on its own, the left beamformer 1120*e* creates a virtual left rear source, and the right beamformer 1120*f* creates a virtual right rear source, as shown in FIG. 11.

Figure 11:
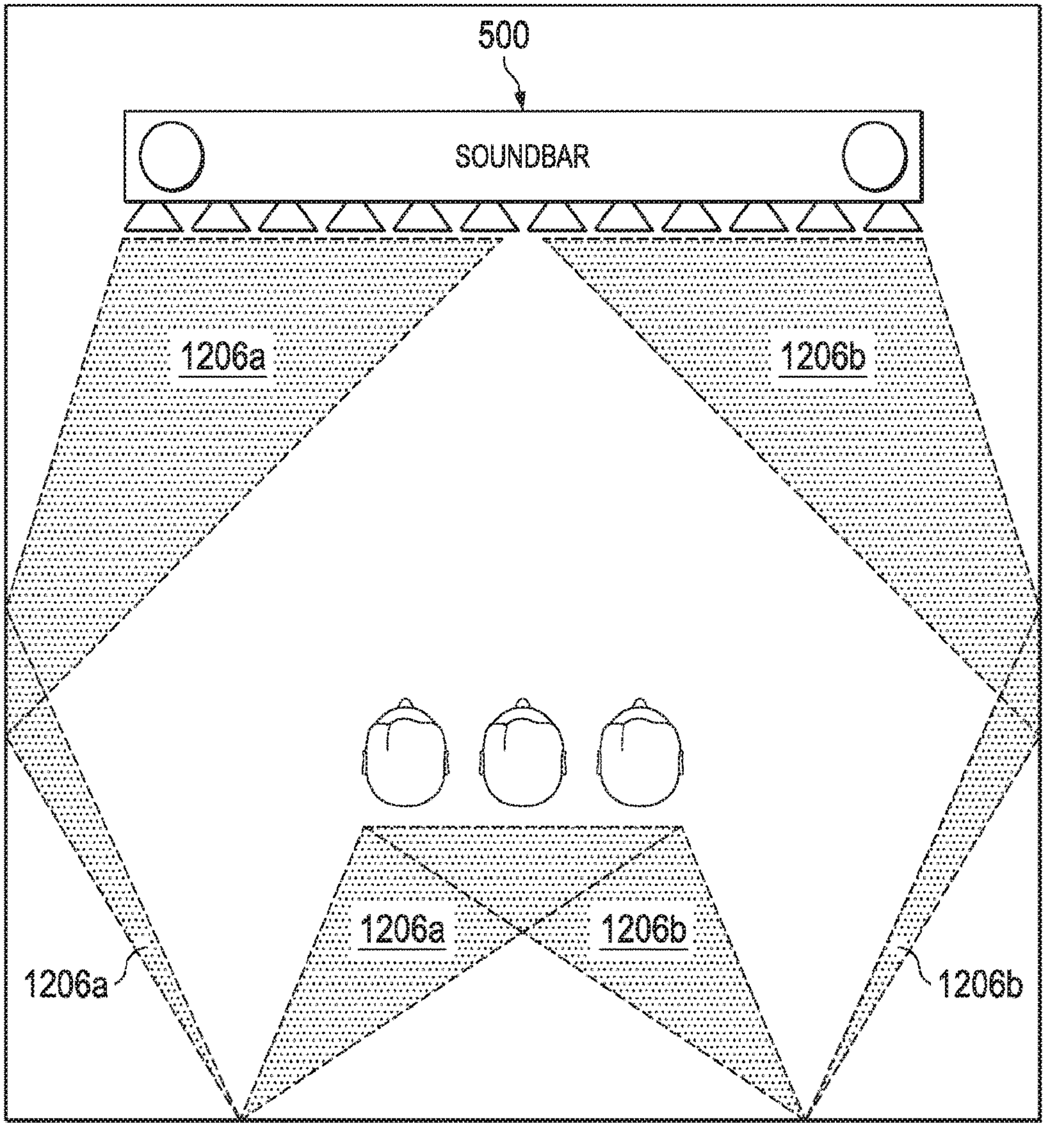
FIG. 11 is a top view of showing the output coverage for the beamformers 1120*e* and 1120*f*, implemented in the soundbar 500 (see FIGS. 5A and 5B) in a room.

FIG. 11 is a top view of showing the output coverage for the beamformers 1120*e* and 1120*f*, implemented in the soundbar 500 (see FIGS. 5A and 5B) in a room. (The output coverage for the other renderers of the rendering system 1100 is as shown in FIGS. 6A-6C.) The virtual left rear output 1206*a* results from the left beamformer 1120*e* (see FIG. 10) generating signals that are reflected from the left wall and back wall of the room. The virtual right rear output 1206*b* results from the right beamformer 1120*f* (see FIG. 10) generating signals that are reflected from the right wall and back wall of the room. (Note the triangular area where 1206*a* and 1206*b* overlap behind the listeners.) For a given audio object, the soundbar 500 may combine the output coverage of FIG. 11 with one or more of the output coverage of FIGS. 6A-6C, e.g. using a routing module such as the routing module 730 (see FIG. 10).

The output coverages of FIGS. 6A-6C and 11 show how the soundbar 500 (see FIGS. 5A and 5B) may be used in place of the loudspeakers in a traditional 7.1-channel (or 7.1.2-channel) surround sound system. The left, center and right loudspeakers of the 7.1-channel system may be replaced by the linear array 502 driven by the sound field renderer 720*a* (see FIG. 7), resulting in the output coverage shown in FIG. 6A. The top loudspeakers of the 7.1.2-channel system may be replaced by the upward firing group 504 driven by the vertical panner 720*d*, resulting in the output coverage shown in FIG. 6C. The left and right surround loudspeakers of the 7.1-channel system may be replaced by the linear array 502 driven by the beamformers 720*b* and 720*c*, resulting in the output coverage shown in FIG. 6B. The left and right rear surround loudspeakers of the 7.1-channel system may be replaced by the linear array 502 driven by the beamformers 1120*e* and 1120*f* (see FIG. 10), resulting in the output coverage shown in FIG. 11. As discussed above, the system enables multiple renderers to render an audio object, according to their combined output coverages, in order to generate an appropriate perceived position for the audio object.

In summary, the systems described herein have an advantage of having the rendering system with the most resolution (e.g., the near field renderer) at the front where most of the cinematographic content is expected to be located (as it matches the screen location) and where human localization accuracy is maximal, while rear, lateral and height rendering remains coarser, which may be less critical for typical cinematographic content. Many of these systems also remain relatively compact and can sensibly be integrated alongside typical visual devices (e.g., above or below the television screen). One feature to keep in mind is that the speaker array can be used to generate concurrently a large number of beams thanks to the superposition principle (e.g., combined using the routing module), to create much more complex systems.

Beyond the output coverages shown above, further configurations may model other loudspeaker setups using other combinations of renderers.

Figure 12:
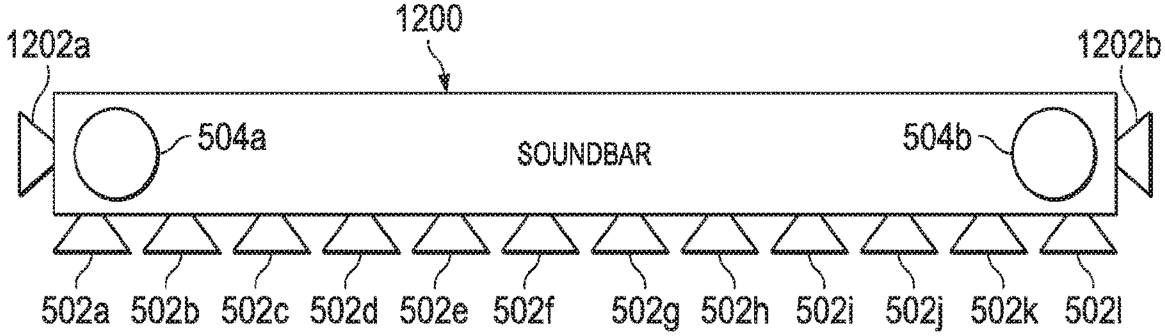
FIG. 12 is a top view of a soundbar 1200.

FIG. 12 is a top view of a soundbar 1200. The soundbar 1200 may implement the rendering system 100 (see FIG. 1). The soundbar 1200 is similar to the soundbar 500 (see FIG. 5A), and includes the linear array 502 (having 12 loudspeakers 502*a*, 502*b*, 502*c*, 502*d*, 502*e*, 502*f*, 502*g*, 502*h*, 502*i*, 502*j*, 502*k* and 502*l*) and the upward firing group 504 (including 2 loudspeakers 504*a* and 504*b*). The soundbar 1200 also includes two side firing loudspeakers 1202*a* and 1202*b*, with the loudspeaker 1202*a* referred to as the left side firing loudspeaker and the loudspeaker 1202*b* referred to as the right side firing loudspeaker.

As compared to the soundbar 500 (see FIG. 5A), the soundbar 1200 uses the side firing loudspeakers 1202*a* and 1202*b* to generate the virtual side outputs 604*a* and 604*b* (see FIG. 6B).

Figure 13:
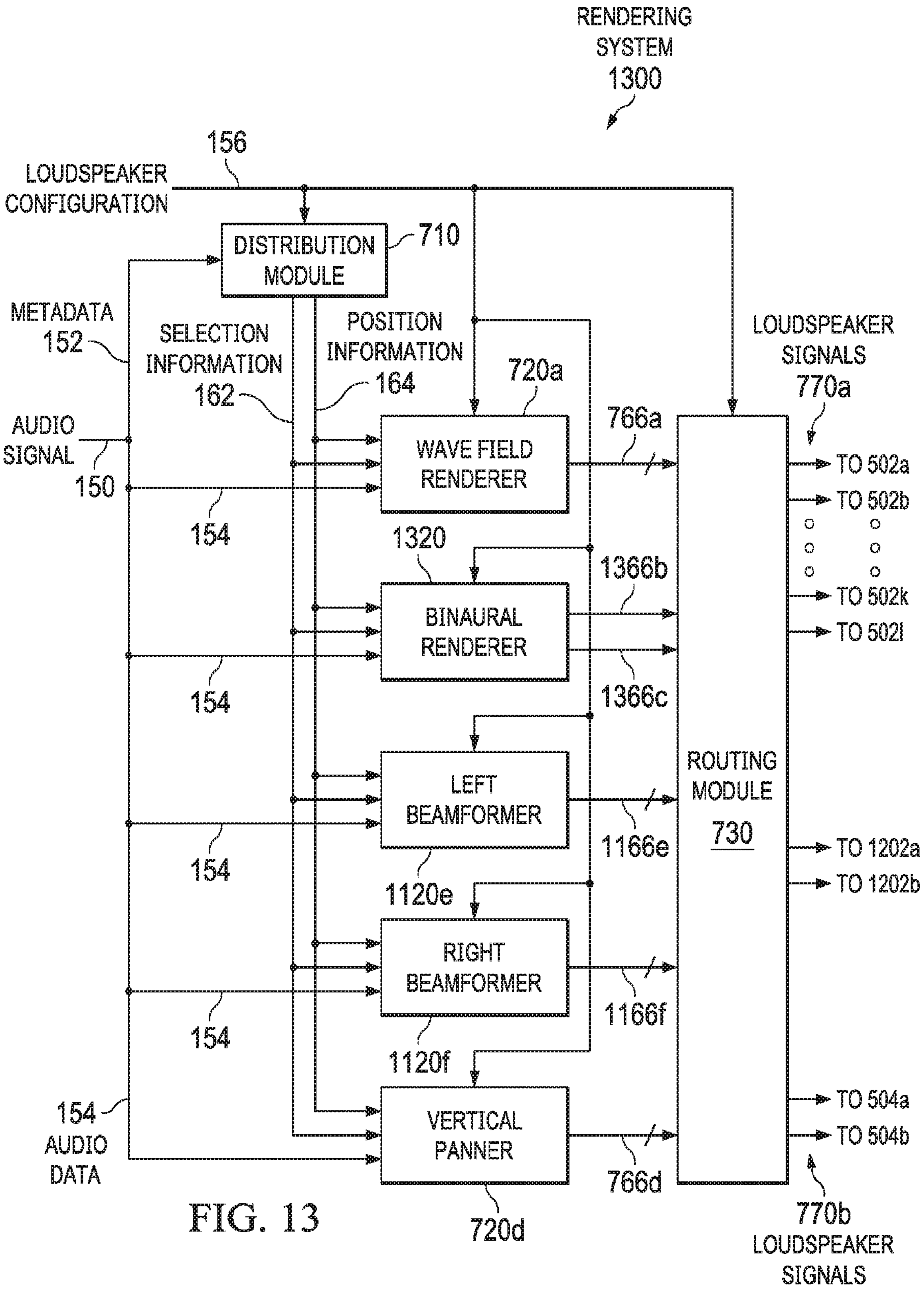
FIG. 13 is a block diagram of a rendering system 1300.

FIG. 13 is a block diagram of a rendering system 1300. The rendering system 1300 is a modification of the rendering system 1100 (see FIG. 10) suitable for implementation in the soundbar 1200 (see FIG. 12). The rendering system 1300 may be implemented using the components of the rendering system 300 (see FIG. 3). The components of the rendering system 1300 are similar to those of the rendering system 1100 and use similar reference numbers. As compared to the rendering system 1100, the rendering system 1300 replaces the beamformers 720*b* and 720*c* with a binaural renderer 1320.

The binaural renderer 1320 receives the loudspeaker configuration information 156, the object audio data 154, the selection information 162, and the position information 164. The binaural renderer 1320 performs binaural rendering on the object audio data 154 and generates a left binaural signal 1366*b* and a right binaural signal 1366*c*. Considering only the side firing loudspeakers 1202*a* and 1202*b* (see FIG. 12), the left binaural signal 1366*b* generally corresponds to the output from the left side firing loudspeaker 1202*a*, and the right binaural signal 1366*c* generally corresponds to the output from the right side firing loudspeaker 1202*b*. (Recall that the routing module 730 will then combine the binaural signals 1366*b* and 1366*c* with the other rendered signals 766 to generate the loudspeaker signals 770 to the full set of loudspeakers 502, 504 and 1202.)

Figure 14:
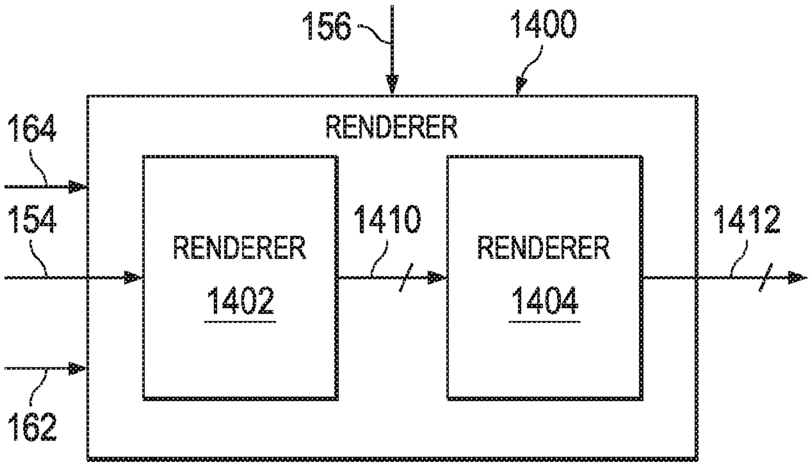
FIG. 14 is a block diagram of a renderer 1400.

FIG. 14 is a block diagram of a renderer 1400. The renderer 1400 may correspond to one or more of the renderers discussed above, such as the renderers 120 (see FIG. 1), the renderers 720 (see FIG. 7), the renderers 1120 (see FIG. 10), etc. The renderer 1400 illustrates that a renderer may include more than one renderer as components thereof. As shown here, the renderer 1400 includes a renderer 1402 in series with a renderer 1404. Although two renderers 1402 and 1404 are shown, the renderer 1400 may include additional renderers, in assorted serial and parallel configurations. The renderer 1400 receives the loudspeaker configuration information 156, the selection information 162, and the position information 164; the renderer 1400 may provide these signals to one or more of the renderers 1402 and 1404, depending upon their particular configurations.

The renderer 1402 receives the object audio data 154, and one or more of the loudspeaker configuration information 156, the selection information 162, and the position information 164. The renderer 1402 performs rendering on the object audio data 154 and generates rendered signals 1410. The rendered signals 1410 generally correspond to intermediate rendered signals. For example, the rendered signals 1410 may be virtual speaker feed signals.

The renderer 1404 receives the rendered signals 1410, and one or more of the loudspeaker configuration information 156, the selection information 162, and the position information 164. The renderer 1404 performs rendering on the rendered signals 1410 and generates rendered signals 1412. The rendered signals 1412 correspond to the rendered signals discussed above, such as the rendered signals 166 (see FIG. 1), the rendered signals 766 (see FIG. 7), the rendered signals 1166 (see FIG. 10), etc. The renderer 1400 may then provide the rendered signals 1412 to a routing module (e.g., the routing module 130 of FIG. 1, the routing module 730 of FIG. 7 or FIG. 10 or FIG. 13), etc. in a manner similar to that discussed above.

In general, the renderers 1402 and 1404 have different types in a manner similar to that discussed above. For example, the types may include amplitude panners, vertical panners, wave field renderers, binaural renderers, and beamformers. A specific example configuration is shown in FIG. 15.

Figure 15:
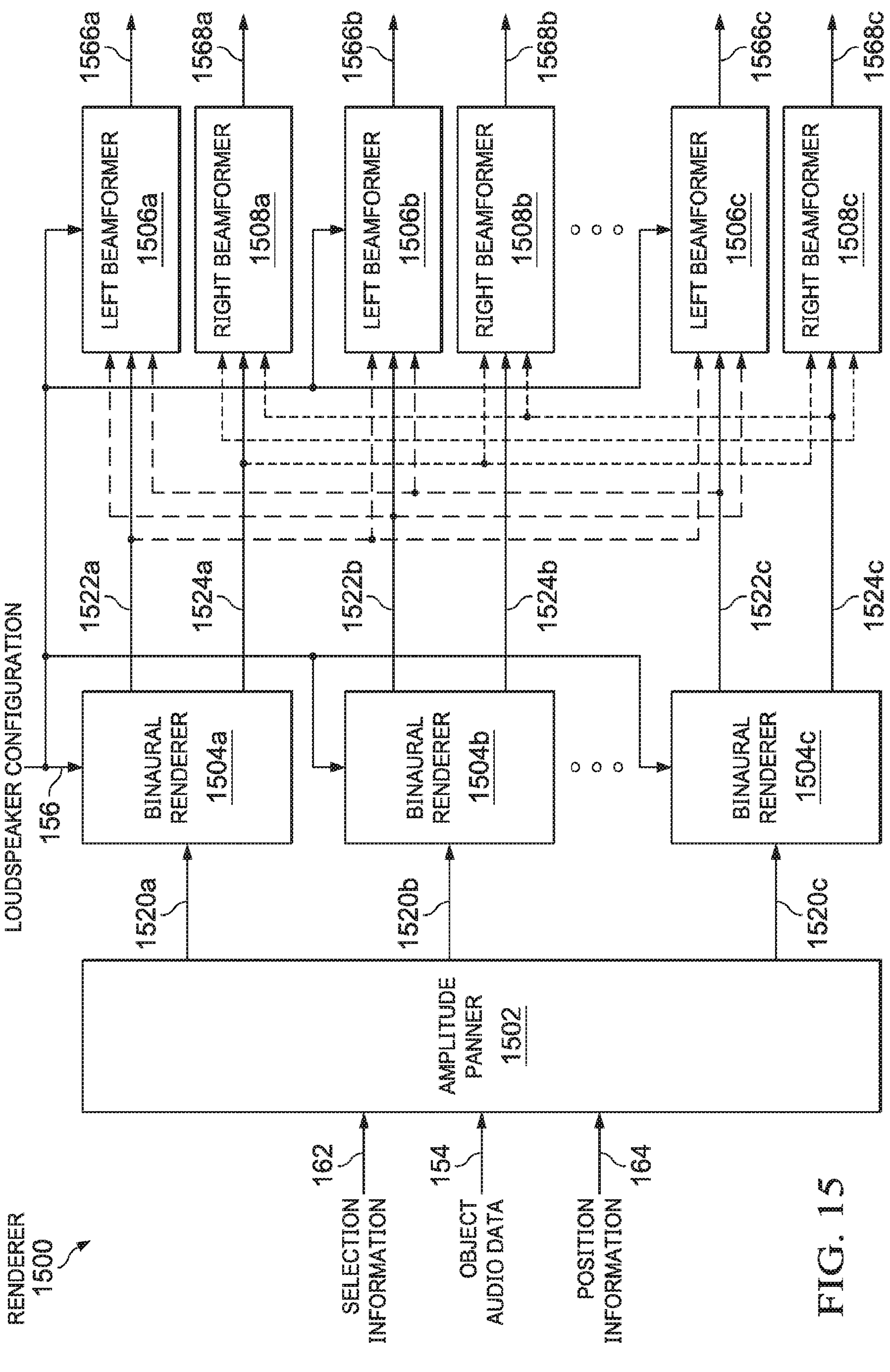
FIG. 15 is a block diagram of a renderer 1500.

FIG. 15 is a block diagram of a renderer 1500. The renderer 1500 may correspond to one or more of the renderers discussed above, such as the renderers 120 (see FIG. 1), the renderers 720 (see FIG. 7), the renderers 1120 (see FIG. 10), the renderer 1400 (see FIG. 14), etc. The renderer 1500 includes an amplitude panner 1502, a number N of binaural renderers 1504 (three shown: 1504*a*, 1504*b* and 1504*c*), and a number M of beamformer sets that include a number of left beamformers 1506 (three shown: 1506*a*, 1506*b* and 1506*c*) and right beamformers 1508 (three shown: 1508*a*, 1508*b* and 1508*c*).

The amplitude panner 1502 receives the object audio data 154, the selection information 162, and the position information 164. The amplitude panner 1502 performs rendering on the object audio data 154 and generates virtual speaker feeds 1520 (three shown: 1520*a*, 1520*b* and 1520*c*), in a manner similar to the other amplitude panners described herein. The virtual speaker feeds 1520 may correspond to canonical loudspeaker feed signals such as 5.1-channel surround signals, 7.1-channel surround signals, 7.1.2-channel surround signals, 7.1.4-channel surround signals, 9.1-channel surround signals, etc. The virtual speaker feeds 1520 are referred to as "virtual" since they need not be provided directly to actual loudspeakers, but instead may be provided to the other renderers in the renderer 1500 for further processing.

The specifics of the virtual speaker feeds 1520 may differ among the various embodiments and implementations of the renderer 1500. For example, when the virtual speaker feeds 1520 include a low-frequency effects channel signal, the amplitude panner 1502 may provide that channel signal to one or more loudspeakers directly (e.g., bypassing the binaural renderers 1504 and the beamformers 1506 and 1508). As another example, when the virtual speaker feeds 1520 include a center channel signal, the amplitude panner 1502 may provide that channel signal to one or more loudspeakers directly, or may provide that signal directly to a set of one of the left beamformers 1506 and one of the right beamformers 1508 (e.g., bypassing the binaural renderers 1504).

The binaural renderers 1504 receive the virtual speaker feeds 1520 and the loudspeaker configuration information 156. (In general, the number N of binaural renderers 1504 depends upon the specifics of the embodiments of the renderer 1500, such as the number of virtual speaker feeds 1520, the type of virtual speaker feed, etc., as discussed above.) The binaural renderers 1504 perform rendering on the virtual speaker feeds 1520 and generate left binaural signals 1522 (three shown: 1522*a*, 1522*b* and 1522*c*) and right binaural signals 1524 (three shown: 1524*a*, 1524*b* and 1524*c*), in a manner similar to the other binaural renderers described herein.

The left beamformers 1506 receive the left binaural signals 1522 and the loudspeaker configuration information 156, and the right beamformers 1508 receive the right binaural signals 1524 and the loudspeaker configuration information 156. Each of the left beamformers 1506 may receive one or more of the left binaural signals 1522, and each of the right beamformers 1508 may receive one or more of the right binaural signals 1524, again depending on the specifics of the embodiments of the renderer 1500 as discussed above. (These one-or-more relationships are indicated by the dashed lines for 1522 and 1524 in FIG. 15.) The left beamformers 1506 perform rendering on the left binaural signals 1522 and generate rendered signals 1566 (three shown: 1566*a*, 1566*b* and 1566*c*). The right beamformers 1508 perform rendering on the right binaural signals 1524 and generate rendered signals 1568 (three shown: 1568*a*, 1568*b* and 1568*c*). The beamformers 1506 and 1508 otherwise operate in a manner similar to the other beamformers described herein. The rendered signals 1566 and 1568 correspond to the rendered signals discussed above, such as the rendered signals 166 (see FIG. 1), the rendered signals 766 (see FIG. 7), the rendered signals 1166 (see FIG. 10), the rendered signals 1412 (see FIG. 14), etc.

The renderer 1500 may then provide the rendered signals 1566 and 1568 to a routing module (e.g., the routing module 130 of FIG. 1, the routing module 730 of FIG. 7 or FIG. 10 or FIG. 13), etc. in a manner similar to that discussed above.

The number M of left beamformers 1506 and right beamformers 1508 depends upon the specifics of the embodiments of the renderer 1500, as discussed above. For example, the number M may be varied based on the form factor of the device that includes the renderer 1500, on the number of loudspeaker arrays that are connected to the renderer 1500, on the capabilities and arrangement of those loudspeaker arrays, etc. As a general guideline, the number M (of beamformers 1506 and 1508) may be less than or equal to the number N (of binaural renderers 1504). As another general guideline, the number of separate loudspeaker arrays may be less than or equal to twice the number N (of binaural renderers 1504). As one example form factor, a device may have physically separate left and right loudspeaker arrays, where the left loudspeaker array produces all the left beams and the right loudspeaker array produces all the right beams. An another example form factor, a device may have physically separate front and rear loudspeaker arrays, where the front loudspeaker array produces the left and right beams for all front binaural signals, and the rear loudspeaker array produces the left and right beams for all rear binaural signals.

Figure 16:
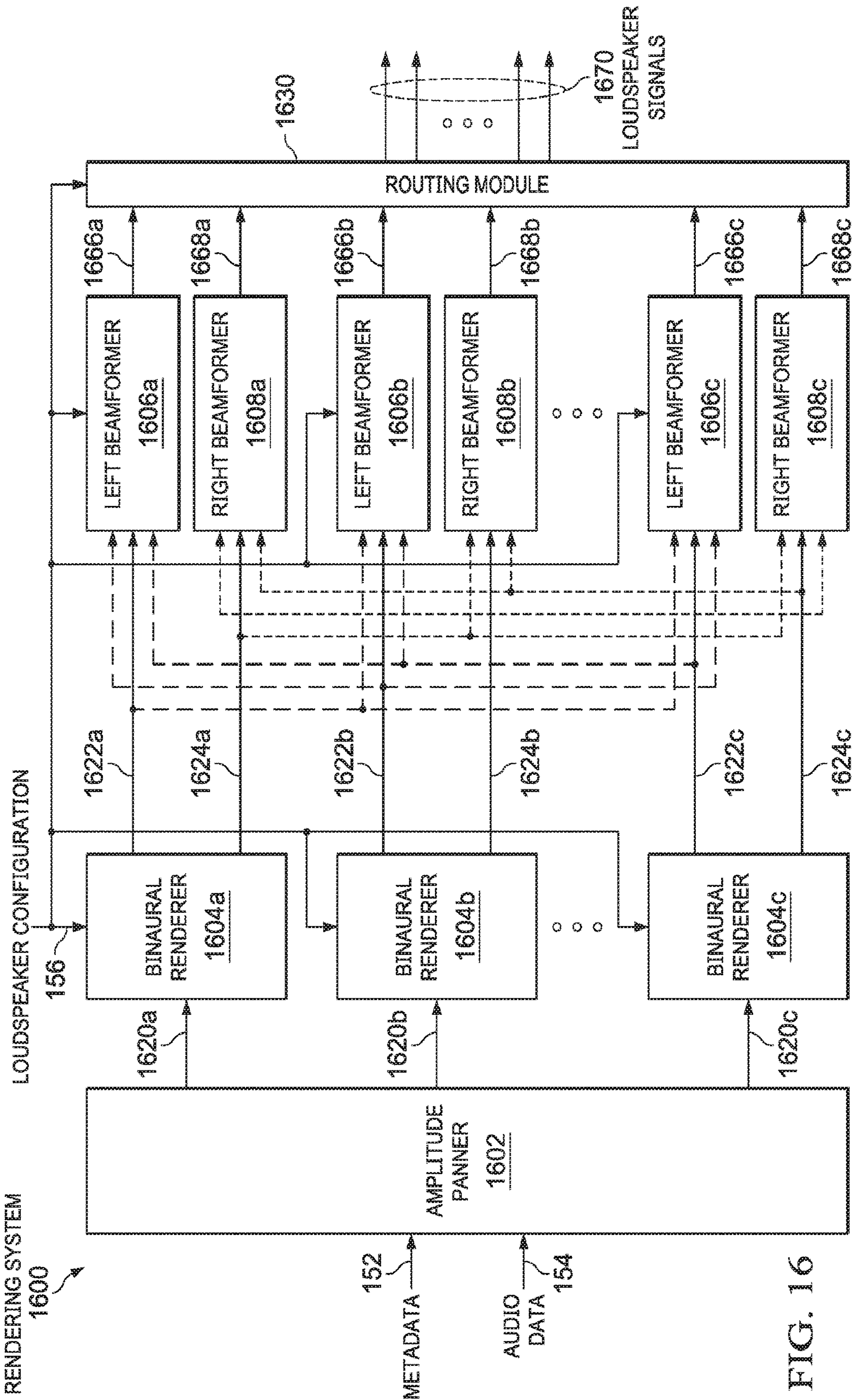
FIG. 16 is a block diagram of a rendering system 1600.

FIG. 16 is a block diagram of a rendering system 1600. The rendering system 1600 is similar to the rendering system 100 (see FIG. 1), with the renderers 120 (see FIG. 1)

replaced by a renderer arrangement similar to that of the renderer 1500 (see FIG. 15); there are also differences relating to the distribution module 110 (see FIG. 1). The rendering system 1600 includes an amplitude panner 1602, a number N of binaural renderers 1604 (three shown: 1604*a*, 1604*b* and 1604*c*), a number M of beamformer sets that include a number of left beamformers 1606 (three shown: 1606*a*, 1606*b* and 1606*c*) and right beamformers 1608 (three shown: 1608*a*, 1608*b* and 1508*c*), and a routing module 1630.

The amplitude panner 1602 receives the object metadata 152 and the object audio data 154, performs rendering on the object audio data 154 according to the position information in the object metadata 152, and generates virtual speaker feeds 1620 (three shown: 1620*a*, 1620*b* and 1620*c*), in a manner similar to the other amplitude panners described herein. Similarly, the specifics of the virtual speaker feeds 1620 may differ among the various embodiments and implementations of the rendering system 1600, in a manner similar to that described above regarding the renderer 1500 (see FIG. 15). (As compared to the rendering system 100 (see FIG. 1), the rendering system 1600 omits the distribution module 110, but uses the amplitude panner 1602 to weight the virtual speaker feeds 1620 among the binaural renderers 1604.)

The binaural renderers 1604 receive the virtual speaker feeds 1620 and the loudspeaker configuration information 156. (In general, the number N of binaural renderers 1604 depends upon the specifics of the embodiments of the rendering system 1600, such as the number of virtual speaker feeds 1620, the type of virtual speaker feed, etc., as discussed above.) The binaural renderers 1604 perform rendering on the virtual speaker feeds 1620 and generate left binaural signals 1622 (three shown: 1622*a*, 1622*b* and 1622*c*) and right binaural signals 1624 (three shown: 1624*a*, 1624*b* and 1624*c*), in a manner similar to the other binaural renderers described herein.

The left beamformers 1606 receive the left binaural signals 1622 and the loudspeaker configuration information 156, and the right beamformers 1608 receive the right binaural signals 1624 and the loudspeaker configuration information 156. Each of the left beamformers 1606 may receive one or more of the left binaural signals 1622, and each of the right beamformers 1608 may receive one or more of the right binaural signals 1624, again depending on the specifics of the embodiments of the rendering system 1600 as discussed above. (These one-or-more relationships are indicated by the dashed lines for 1622 and 1624 in FIG. 16.) The left beamformers 1606 perform rendering on the left binaural signals 1622 and generate rendered signals 1666 (three shown: 1666*a*, 1666*b* and 1666*c*). The right beamformers 1608 perform rendering on the right binaural signals 1624 and generate rendered signals 1668 (three shown: 1668*a*, 1668*b* and 1668*c*). The beamformers 1606 and 1608 otherwise operate in a manner similar to the other beamformers described herein.

The routing module 1630 receives the loudspeaker configuration information 156, the rendered signals 1666 and the rendered signals 1668. The routing module 1630 generates loudspeaker signals 1670, in a manner similar to the other routing modules described herein.

Figure 17:
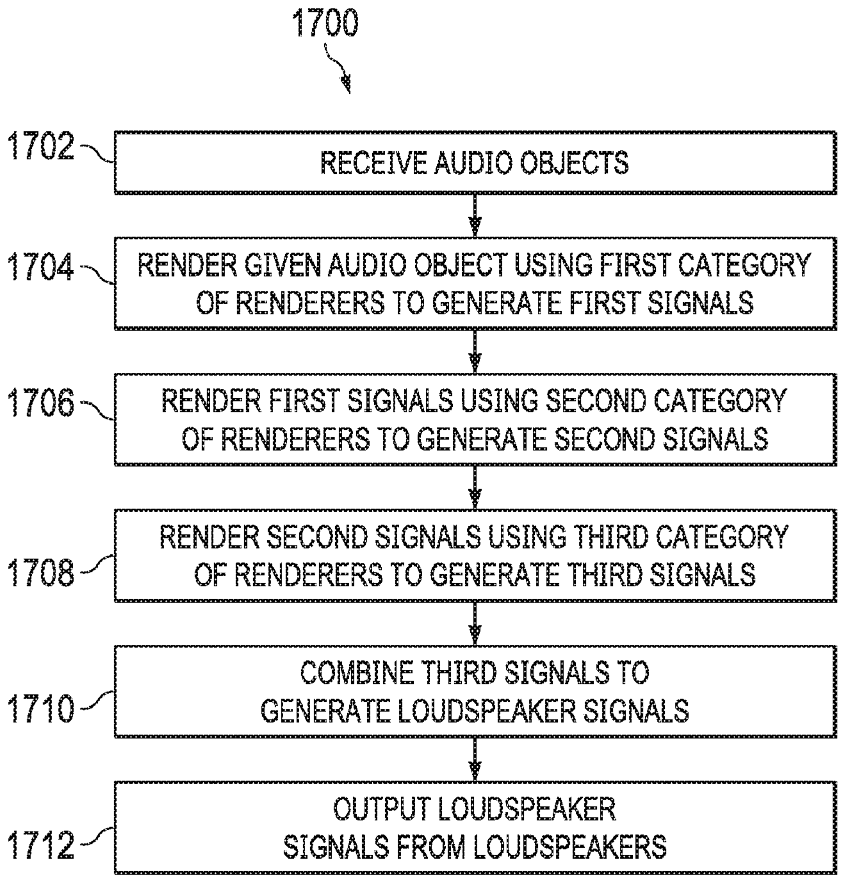
FIG. 17 is a flowchart of a method 1700 of audio processing.

FIG. 17 is a flowchart of a method 1700 of audio processing. The method 1700 may be performed by the rendering system 1600 (see FIG. 16). The method 1700 may be implemented by one or more computer programs, for example that the rendering system 1600 executes to control its operation.

At 1702, one or more audio objects are received. Each of the audio objects respectively includes position information. As an example, the rendering system 1600 (see FIG. 16) may receive the audio signal 150, which includes the object metadata 152 and the object audio data 154. For each of the audio objects, the method continues with 1704.

At 1704, for a given audio object, the given audio object is rendered, based on the position information, using a first category of renderer to generate a first plurality of signals. For example, the amplitude panner 1602 (see FIG. 16) may render the given audio object (in the object audio data 154) based on the position information (in the object metadata 152) to generate the virtual loudspeaker signals 1620.

At 1706, for the given audio object, the first plurality of signals are rendered using a second category of renderer to generate a second plurality of signals. For example, the binaural renderers 1604 (see FIG. 16) may render the virtual speaker feeds 1620 to generate the left binaural signals 1622 and the right binaural signals 1624.

At 1708, for the given audio object, the second plurality of signals are rendered using a third category of renderer to generate a third plurality of signals. For example, the left beamformers 1606 may render the left binaural signals 1622 to generate the rendered signals 1666, and the right beamformers 1608 may render the right binaural signals 1624 to generate the rendered signals 1668.

At 1710, the third plurality of signals are combined to generate a plurality of loudspeaker signals. For example, the routing module 1630 (see FIG. 16) may combine the rendered signals 1666 and the rendered signals 1668 to generate the loudspeaker signals 1670.

At 1712, the plurality of loudspeaker signals (see 1708) are output from a plurality of loudspeakers.

When multiple audio objects are to be output concurrently, the method 1700 operates similarly. For example, multiple given audio objects may be processed using multiple paths of 1704-1706-1708 in parallel, with the rendered signals corresponding to the multiple audio objects being combined (see 1710) to generate the loudspeaker signals.

As another example, multiple given audio objects may be processed by combining the rendered signal for each audio object at the output one or more of the rendering stages. Applying this example to the rendering system 1600 (see FIG. 16), the amplitude panner 1602 may render the multiple given audio objects, each of the virtual loudspeaker signals 1620 corresponds to a combined rendering that combines the multiple given audio objects, and the binaural renderers 1604 and the beamformers 1606 and 1608 operate on the combined rendering.

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Various aspects of the present invention may be appreciated from the following enumerated example embodiments (EEEs):

1. A method of audio processing, the method comprising:
   receiving one or more audio objects, wherein each of the one or more audio objects respectively includes position information;
   for a given audio object of the one or more audio objects:
      selecting, based on the position information of the given audio object, at least two renderers of a plurality of renderers, wherein the at least two renderers have at least two categories;
      determining, based on the position information of the given audio object, at least two weights;
      rendering, based on the position information, the given audio object using the at least two renderers weighted according to the at least two weights, to generate a plurality of rendered signals; and
      combining the plurality of rendered signals to generate a plurality of loudspeaker signals; and
   outputting, from a plurality of loudspeakers, the plurality of loudspeaker signals.
2. The method of EEE 1, wherein the at least two categories include a sound field renderer, a beamformer, a panner, and a binaural renderer.
3. The method of any one of EEEs 1-2, wherein a given rendered signal of the plurality of rendered signals includes at least one component signal,
   wherein each of the at least one component signal is associated with a respective one of the plurality of loudspeakers, and
   wherein a given loudspeaker signal of the plurality of loudspeaker signals corresponds to combining, for a given loudspeaker of the plurality of loudspeakers, all of the at least one component signal that are associated with the given loudspeaker.
4. The method of EEE 3, wherein a first renderer generates a first rendered signal, wherein the first rendered signal includes a first component signal associated with a first loudspeaker and a second component signal associated with a second loudspeaker,
   wherein a second renderer generates a second rendered signal, wherein the second rendered signal includes a third component signal associated with the first loudspeaker and a fourth component signal associated with the second loudspeaker,
   wherein a first loudspeaker signal associated with the first loudspeaker corresponds to combining the first component signal and the third component signal, and
   wherein a second loudspeaker signal associated with the second loudspeaker corresponds to combining the second component signal and the fourth component signal.
5. The method of any one of EEEs 1-4, wherein rendering the given audio object includes, for a given renderer of the plurality of renderers, applying a gain based on the position information to generate a given rendered signal of the plurality of rendered signals.
6. The method of any one of EEEs 1-5, wherein the plurality of loudspeakers includes a dense linear array of loudspeakers.
7. The method of any one of EEEs 1-6, wherein the at least two categories includes a sound field renderer, wherein the sound field renderer performs a wave field synthesis process.
8. The method of any one of EEEs 1-7, wherein the plurality of loudspeakers are arranged in a first group that is directed in a first direction and a second group that is directed in a second direction that differs from the first direction.
9. The method of EEE 8, wherein the first direction includes a forward component and the second direction includes a vertical component.
10. The method of EEE 8, wherein the second direction includes a vertical component, wherein the at least two renderers includes a wave field synthesis renderer and an upward firing panning renderer, and wherein the wave field synthesis renderer and the upward firing panning renderer generate the plurality of rendered signals for the second group.
11. The method of EEE 8, wherein the second direction includes a vertical component, wherein the at least two renderers includes a wave field synthesis renderer, an upward firing panning renderer and a beamformer, and wherein the wave field synthesis renderer, the upward firing panning renderer and the beamformer generate the plurality of rendered signals for the second group.
12. The method of EEE 8, wherein the second direction includes a vertical component, wherein the at least two renderers includes a wave field synthesis renderer, an upward firing panning renderer and a side firing panning renderer, and wherein the wave field synthesis renderer, the upward firing panning renderer and the side firing panning renderer generate the plurality of rendered signals for the second group.
13. The method of EEE 8, wherein the first direction includes a forward component and the second direction includes a side component.
14. The method of EEE 8, wherein the first direction includes a forward component, wherein the at least two renderers includes a wave field synthesis renderer, and wherein the wave field synthesis renderer generates the plurality of rendered signals for the first group.
15. The method of EEE 8, wherein the second direction includes a side component, wherein the at least two renderers includes a wave field synthesis renderer and a beamformer, and wherein the wave field synthesis renderer and the beamformer generate the plurality of rendered signals for the second group.

16. The method of EEE 8, wherein the second direction includes a side component, wherein the at least two renderers includes a wave field synthesis renderer and a side firing panning renderer, and wherein the wave field synthesis renderer and the side firing panning renderer generate the plurality of rendered signals for the second group.

17. The method of any one of EEEs 1-16, further comprising:

combining the plurality of rendered signals for the one or more audio objects to generate the plurality of loudspeaker signals.

18. The method of any one of EEEs 1-17, wherein the at least two renderers includes renderers in series.

19. The method of any one of EEEs 1-18, wherein the at least two renderers includes an amplitude panner, a plurality of binaural renderers, and a plurality of beamformers;

wherein the amplitude panner is configured to render, based on the position information, the given audio object to generate a first plurality of signals;

wherein the plurality of binaural renderers is configured to render the first plurality of signals to generate a second plurality of signals;

wherein the plurality of beamformers is configured to render the second plurality of signals to generate a third plurality of signals; and wherein the third plurality of signals are combined to generate the plurality of loudspeaker signals.

20. An apparatus for processing audio, the apparatus comprising:

a plurality of loudspeakers;

a processor; and a memory, wherein the processor is configured to control the apparatus to receive one or more audio objects, wherein each of the one or more audio objects respectively includes position information;

wherein for a given audio object of the one or more audio objects:

the processor is configured to control the apparatus to select, based on the position information of the given audio object, at least two renderers of a plurality of renderers, wherein the at least two renderers have at least two categories;

the processor is configured to control the apparatus to determine, based on the position information of the given audio object, at least two weights;

the processor is configured to control the apparatus to render, based on the position information, the given audio object using the at least two renderers weighted according to the at least two weights, to generate a plurality of rendered signals; and the processor is configured to control the apparatus to combine the plurality of rendered signals to generate a plurality of loudspeaker signals; and wherein the processor is configured to control the apparatus to output, from the plurality of loudspeakers, the plurality of loudspeaker signals.

21. A method of audio processing, the method comprising:

receiving one or more audio objects, wherein each of the one or more audio objects respectively includes position information;

for a given audio object of the one or more audio objects:

rendering, based on the position information, the given audio object using a first category of renderer to generate a first plurality of signals;

rendering the first plurality of signals using a second category of renderer to generate a second plurality of signals;

rendering the second plurality of signals using a third category of renderer to generate a third plurality of signals; and combining the third plurality of signals to generate a plurality of loudspeaker signals; and outputting, from a plurality of loudspeakers, the plurality of loudspeaker signals.

22. The method of EEE 21, wherein the first category of renderer corresponds to an amplitude panner, wherein the second category of renderer corresponds to a plurality of binaural renderers, and wherein the third category of renderer corresponds to a plurality of beamformers.

23. A non-transitory computer readable medium storing a computer program that, when executed by a processor, controls an apparatus to execute processing including the method of any one of EEEs 1-19, 21 or 22.

24. An apparatus for processing audio, the apparatus comprising:

a plurality of loudspeakers;

a processor; and a memory, wherein the processor is configured to control the apparatus to receive one or more audio objects, wherein each of the one or more audio objects respectively includes position information;

wherein for a given audio object of the one or more audio objects:

the processor is configured to control the apparatus to render, based on the position information, the given audio object using a first category of renderer to generate a first plurality of signals, the processor is configured to control the apparatus to render the first plurality of signals using a second category of renderer to generate a second plurality of signals, the processor is configured to control the apparatus to render the second plurality of signals using a third category of renderer to generate a third plurality of signals, and the processor is configured to control the apparatus to combine the third plurality of signals to generate a plurality of loudspeaker signals; and wherein the processor is configured to control the apparatus to output, from the plurality of loudspeakers, the plurality of loudspeaker signals.

REFERENCES

U.S. Application Pub. No. 2016/0300577.
U.S. Application Pub. No. 2017/0048640.
International Application Pub. No. WO 2017/087564 A1.
U.S. Application Pub. No. 2015/0245157.
H. Wittek, F. Rumsey, and G. Theile, "Perceptual Enhancement of Wavefield Synthesis by Stereophonic Means," Journal of the Audio Engineering Society, vol. 55, no. 9, pp. 723-751, 2007.
U.S. Pat. No. 7,515,719.
U.S. Application Pub. No. 2015/0350804.

M. N. Montag, "Wave field synthesis in Three Dimensions by Multiple Line Arrays," University of Miami, 2011.

R. Ranjan and W. S. Gan, "A hybrid speaker array-headphone system for immersive 3D audio reproduction," Proceedings of the 2015 IEEE International Conference on Acoustics, Speech and Signal Processing (ICASSP), pp. 1836-1840, April 2015.

V. Pulkki, "Virtual sound source positioning using vector base amplitude panning," Journal of the Audio Engineering Society, vol. 45, no. 6, pp. 456-466, 1997.

U.S. Pat. No. 7,515,719.

H. Wierstorf, "Perceptual Assessment of Sound Field Synthesis," Technische Universitat Berlin, 2014.

The invention claimed is:

1. A method of audio processing, the method comprising:

receiving one or more audio objects, wherein each of the one or more audio objects respectively includes position information;

for a given audio object of the one or more audio objects:

selecting, based on the position information of the given audio object, at least two renderers of a plurality of renderers;

determining, based on the position information of the given audio object, at least two weights;

rendering, based on the position information, the given audio object using the at least two renderers weighted according to the at least two weights, to generate a plurality of rendered signals; and combining the plurality of rendered signals to generate a plurality of loudspeaker signals; and outputting, from a plurality of loudspeakers, the plurality of loudspeaker signals, wherein the plurality of loudspeakers is arranged in a first group that is directed in a first direction and a second group that is directed in a second direction that differs from the first direction, wherein the second direction includes a vertical component, wherein the at least two renderers include a wave field synthesis renderer, an upward firing panning renderer and a beamformer, and wherein the wave field synthesis renderer, the upward firing panning renderer and the beamformer generate the plurality of rendered signals for the second group.

2. The method of claim 1, wherein the at least two renderers are classified in at least two categories.

3. The method of claim 2, wherein the at least two categories include a sound field renderer, a beamformer, a panner, and a binaural renderer.

4. The method of claim 1, wherein a given rendered signal of the plurality of rendered signals includes at least one component signal, wherein each of the at least one component signal is associated with a respective one of the plurality of loudspeakers, and wherein a given loudspeaker signal of the plurality of loudspeaker signals corresponds to combining, for a given loudspeaker of the plurality of loudspeakers, all of the at least one component signal that are associated with the given loudspeaker.

5. The method of claim 4, wherein a first renderer generates a first rendered signal, wherein the first rendered signal includes a first component signal associated with a first loudspeaker and a second component signal associated with a second loudspeaker, wherein a second renderer generates a second rendered signal, wherein the second rendered signal includes a third component signal associated with the first loudspeaker and a fourth component signal associated with the second loudspeaker, wherein a first loudspeaker signal associated with the first loudspeaker corresponds to combining the first component signal and the third component signal, and wherein a second loudspeaker signal associated with the second loudspeaker corresponds to combining the second component signal and the fourth component signal.

6. The method of claim 1, wherein rendering the given audio object includes, for a given renderer of the plurality of renderers, applying a gain based on the position information to generate a given rendered signal of the plurality of rendered signals.

7. The method of claim 1, wherein the at least two renderers includes renderers in series.

8. A computer program comprising instructions that, when the program is executed by a processor, controls an apparatus to execute processing including the method of claim 1.

9. The method of claim 1, wherein each of the one or more audio objects respectively includes metadata that includes the position information.

10. The method of claim 1, wherein the rendering is performed in a time domain.

11. The method of claim 1, wherein the rendering is performed in a frequency domain, and wherein combining the plurality of rendered signals to generate the plurality of loudspeaker signals includes:

transforming the plurality of rendered signals from the frequency domain to a time domain.

12. The method of claim 1, wherein the at least two renderers includes a first renderer and a second renderer, wherein an output of the first renderer is an input of the second renderer.

13. The method of claim 1, further comprising:

cross-fading the plurality of rendered signals according to the at least two weights to provide a perception of movement as the position information changes.

14. An apparatus for processing audio, the apparatus comprising:

a plurality of loudspeakers;

a processor; and a memory, wherein the processor is configured to control the apparatus to receive one or more audio objects, wherein each of the one or more audio objects respectively includes position information;

wherein for a given audio object of the one or more audio objects:

the processor is configured to control the apparatus to select, based on the position information of the given audio object, at least two renderers of a plurality of renderers;

the processor is configured to control the apparatus to determine, based on the position information of the given audio object, at least two weights;

the processor is configured to control the apparatus to render, based on the position information, the given audio object using the at least two renderers weighted according to the at least two weights, to generate a plurality of rendered signals; and the processor is configured to control the apparatus to combine the plurality of rendered signals to generate a plurality of loudspeaker signals; and wherein the processor is configured to control the apparatus to output, from the plurality of loudspeakers, the plurality of loudspeaker signals, wherein the plurality of loudspeakers is arranged in a first group that is directed in a first direction and a second group that is directed in a second direction that differs from the first direction, wherein the second direction includes a vertical component, wherein the at least two renderers include a wave field synthesis renderer, an upward firing panning renderer and a beamformer, and wherein the wave field synthesis renderer, the upward firing panning renderer and the beamformer generate the plurality of rendered signals for the second group.

15. The apparatus of claim 14, wherein rendering the given audio object includes, for a given renderer of the plurality of renderers, applying a gain based on the position information to generate a given rendered signal of the plurality of rendered signals.

16. The apparatus of claim 14, wherein each of the one or more audio objects respectively includes metadata that includes the position information.

17. The apparatus of claim 14, wherein the rendering is performed in a time domain.

18. The apparatus of claim 14, wherein the rendering is performed in a frequency domain, and wherein combining the plurality of rendered signals to generate the plurality of loudspeaker signals includes:

transforming the plurality of rendered signals from the frequency domain to a time domain.

19. The apparatus of claim 14, wherein the at least two renderers includes a first renderer and a second renderer, wherein an output of the first renderer is an input of the second renderer.

20. The apparatus of claim 14, wherein the processor is configured to control the apparatus to cross-fade the plurality of rendered signals according to the at least two weights to provide a perception of movement as the position information changes.

* * * * *